(12) United States Patent
Zhang et al.

(10) Patent No.: US 10,002,023 B2
(45) Date of Patent: Jun. 19, 2018

(54) METHOD AND APPARATUS FOR MANAGING ONE OR MORE TASKS OF A MANY-CORE SYSTEM USING ONE OR MORE TASK DESCRIPTOR ENTRIES

(71) Applicant: Huawei Technologies Co., Ltd., Shenzhen (CN)

(72) Inventors: Lunkai Zhang, Beijing (CN); DongRui Fan, Beijing (CN); Hao Zhang, Beijing (CN); Xiaochun Ye, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 14/976,029

(22) Filed: Dec. 21, 2015

(65) Prior Publication Data

US 2016/0103709 A1    Apr. 14, 2016

Related U.S. Application Data

(63) Continuation of application No. PCT/CN2014/080275, filed on Jun. 19, 2014.

(30) Foreign Application Priority Data

Jun. 21, 2013  (CN) .......................... 2013 1 0248251

(51) Int. Cl.
    *G06F 9/46*  (2006.01)
    *H04L 12/28*  (2006.01)
    (Continued)

(52) U.S. Cl.
    CPC .............. *G06F 9/4881* (2013.01); *G06F 9/50* (2013.01); *G06F 2209/483* (2013.01); *G06F 2209/486* (2013.01); *G06F 2209/5021* (2013.01)

(58) Field of Classification Search
    None
    See application file for complete search history.

(56) References Cited

U.S. PATENT DOCUMENTS

| 6,078,944 A | 6/2000 | Enko et al. |
| 7,533,237 B1 | 5/2009 | Nordquist |
| | (Continued) | |

FOREIGN PATENT DOCUMENTS

| CN | 101387952 A | 3/2009 |
| CN | 101504617 A | 8/2009 |
| | (Continued) | |

OTHER PUBLICATIONS

Machine Translation and Abstract of Chinese Patent Application No. CN101387952, Mar. 18, 2009, 8 pages.

(Continued)

*Primary Examiner* — Bing Zhao
(74) *Attorney, Agent, or Firm* — Conley Rose, P.C.

(57) ABSTRACT

A method and an apparatus for managing and scheduling tasks in a many-core system are presented. The method improves process management efficiency in the many-core system. The method includes, when a process needs to be added to a task linked list, adding a process descriptor pointer of the process to a task descriptor entry corresponding to the process, and adding the task descriptor entry to the task linked list; if a process needs to be deleted, finding a task descriptor entry corresponding to the process, and removing the task descriptor entry from the task linked list; and when a processor core needs to run a new task, removing an available priority index register with a highest priority from a queue of the priority index register.

15 Claims, 28 Drawing Sheets

(51) Int. Cl.
*G06F 9/48* (2006.01)
*G06F 9/50* (2006.01)

(56) References Cited

U.S. PATENT DOCUMENTS

2009/0034549 A1* 2/2009 Soni .................. H04L 49/90
370/412
2009/0133023 A1 5/2009 Li
2013/0074088 A1 3/2013 Purcell et al.

FOREIGN PATENT DOCUMENTS

| CN | 101673223 A | 3/2010 |
|----|-------------|--------|
| CN | 101916209 A | 12/2010 |
| CN | 102043668 A | 5/2011 |
| CN | 102331923 A | 1/2012 |
| CN | 102541653 A | 7/2012 |

OTHER PUBLICATIONS

Machine Translation and Abstract of Chinese Patent Application No. CN101673223, Mar. 17, 2010, 6 pages.
Machine Translation and Abstract of Chinese Patent Application No. CN102043668, May 4, 2011, 9 pages.
Foreign Communication From a Counterpart Application, Chinese Application No. 201310248251.7, Chinese Office Action dated Feb. 8, 2017, 7 pages.
Foreign Communication From a Counterpart Application, PCT Application No. PCT/CN2014/080275, English Translation of International Search Report dated Sep. 26, 2014, 2 pages.
Foreign Communication From a Counterpart Application, PCT Application No. PCT/CN2014/080275, English Translation of Written Opinion dated Sep. 26, 2014, 5 pages.

* cited by examiner

METHOD AND APPARATUS FOR MANAGING ONE OR MORE TASKS OF A MANY-CORE SYSTEM USING ONE OR MORE TASK DESCRIPTOR ENTRIES

CROSS-REFERENCE TO RELATED APPLICATIONS

This application is a continuation of International Application No. PCT/CN2014/080275, filed on Jun. 19, 2014, which claims priority to Chinese Patent Application No. 201310248251.7, filed on Jun. 21, 2013, both of which are hereby incorporated by reference in their entireties.

TECHNICAL FIELD

The present disclosure relates to the field of computers, and in particular, to a method and an apparatus for managing a task of a many-core system.

BACKGROUND

In a future processor manufacturing technique, more and more processor cores may be integrated on a single chip. This type of processor integrating many processor cores is typically referred to as a many-core processor. If a task scheduling method using only operating system software is still adopted for scheduling a task of an operating system in a many-core processor environment, an efficiency bottleneck of the task scheduling may become a bottleneck of the entire system; and if a scheduling method using only hardware is adopted, a hardware system may become extremely complicated, which further increases hardware design and authentication difficulties, and may cause a problem that the system is completely incompatible with an existing system.

In the prior art, a Linux system is used as an example: In a single-core processor environment, a system task is managed by a run queue structure; each central processing unit (CPU) includes two run queue structures, that is, an active run queue and an expired run queue; each of the run queue structures includes a ready task queue with 140 priorities, a task in a ready state is inserted into a queue with a corresponding priority in the active run queue, and for each task, there is a time slice for deciding duration in which the task can be executed. When duration in which a task is executed exceeds a length of a time slice, the task is suspended and moved to a queue with a corresponding priority in the expired run queue, and the length of the time slice of the task and a priority of the task are recalculated in a moving process. If a queue with a priority in the active run queue is empty at present, a position of the queue with the corresponding priority in the active run queue is swapped with a position of a queue with the corresponding priority in the expired run queue, that is, a task in the queue with the corresponding priority in the expired run queue is moved into the active run queue. Each time task scheduling is required, the Linux system invokes a scheduler( ) function to traverse an active run queue of a corresponding CPU, and obtains a ready task with a highest priority in the active run queue and runs the ready task.

In a many-core processor, each processor core has its own run queue. When a task is created, the task is inserted into a run queue of a processor core. This may cause a task imbalance between processor cores. Therefore, it is necessary to perform load balancing on all the processor cores at intervals, so as to keep balance of task loads between the processor cores.

In this view, the inventor finds that, during the task scheduling implemented by the many-core processor, the prior art has at least the following problem:

An algorithm of load balancing is extremely complicated, and its execution time increases with a quantity of processor cores; in a future many-core processor, a time required for load balancing for a run queue may reduce running efficiency of a system; and each time a CPU invokes a scheduler( ) function, the system may lock the run queue, and in this case, each processor core needs to wait for a run queue resource. Therefore, frequent waiting of the system for a run queue resource also lowers process management efficiency in the system.

SUMMARY

Embodiments of the present disclosure provide a many-core system, a method and an apparatus for managing a task of the many-core system, which improves process management efficiency in the many-core system.

To achieve the foregoing objective, the following technical solutions are adopted in the embodiments of the present disclosure.

According to a first aspect, a method for managing a task of a many-core system is provided, where the method includes obtaining a corresponding first task descriptor entry according to a value of a head index in an index register of a first task queue, where the first task descriptor entry is corresponding to a first index number, the first index number is corresponding to the value of the head index, and the head index indicates the first index number corresponding to the first task descriptor entry of a first process at the beginning of the first task queue; obtaining, according to a first process descriptor pointer in the first task descriptor entry, a first process descriptor corresponding to the first process, where the first process descriptor pointer points to an address of memory in which the first process descriptor is located; and obtaining a corresponding second task descriptor entry according to a value of a next task index in the first task descriptor entry, and obtaining, according to a second process descriptor pointer in the second task descriptor entry, a second process descriptor corresponding to a second process, until a third process descriptor corresponding to a value of a tail index in the index register of the first task queue is obtained, where the second task descriptor entry is corresponding to a second index number, the second index number is corresponding to the value of the next task index in the first task descriptor entry, and the tail index indicates a third index number corresponding to a third task descriptor entry of a third process at the end of the first task queue.

In a first possible implementation manner, with reference to the first aspect, if a fourth process needs to be inserted into a task queue corresponding to the fourth process, the method further includes obtaining a fourth process descriptor pointer and a fourth process priority of the fourth process; obtaining a fourth task descriptor entry corresponding to a value of a head index in an index register of an empty queue, and modifying a value of a process descriptor pointer in the fourth task descriptor entry to a value of the fourth process descriptor pointer, where the index register of the empty queue is used to record a task queue in an idle state; modifying the value of the head index in the index register of the empty queue to a value of a next task index in the fourth task descriptor entry; modifying the value of the next task index in the fourth task descriptor entry to a value of a head index in an index register of a queue with a fourth priority corresponding to the fourth process priority; and modifying the value of the head index in the index register of the queue with the fourth priority to an index number corresponding to the fourth task descriptor entry.

In a second possible implementation manner, with reference to the first aspect, if a fifth process needs to be deleted from a task queue corresponding to the fifth process, the method further includes obtaining a fifth process descriptor pointer and a fifth process priority of the fifth process; traversing an entire queue with a fifth priority from a task descriptor entry that is corresponding to a value of a head index in an index register of the queue with the fifth priority corresponding to the fifth process priority, and obtaining a fifth task descriptor entry corresponding to the fifth process; and removing the fifth process from the index register of the queue with the fifth priority.

In a third possible implementation manner, with reference to the second possible implementation manner of the first aspect, the removing the fifth process from the index register of the queue with the fifth priority includes, if the value of the head index or a value of a tail index in the index register of the queue with the fifth priority is corresponding to an index number of the fifth task descriptor entry corresponding to the fifth process, modifying the value of the head index or the value of the tail index in the index register of the queue with the fifth priority to a value of a next task index in the fifth task descriptor entry corresponding to the fifth process; or if the value of the head index or a value of a tail index in the index register of the queue with the fifth priority is not corresponding to an index number of the fifth task descriptor entry corresponding to the fifth process, modifying a value of a next task index in the fifth task descriptor entry to a value of a head index in an index register of an empty queue, modifying the value of the head index in the index register of the empty queue to the index number corresponding to the fifth task descriptor entry, and if a value of a tail index in the index register of the empty queue is null, modifying the value of the tail index in the index register of the empty queue to the index number corresponding to the fifth task descriptor entry.

In a fourth possible implementation manner, with reference to the first aspect, when a processor core needs to run a sixth process, the method further includes obtaining, among index registers with all priorities, an index register with a sixth priority that is a highest priority, where a value of a head index in the index register with the sixth priority is not null; obtaining a sixth task descriptor entry corresponding to the value of the head index in the index register with the sixth priority; modifying the value of the head index in the index register with the sixth priority to a value of a next task index in the sixth task descriptor entry; modifying the value of the next task index in the sixth task descriptor entry to a value of a head index in an index register of an empty queue; modifying the value of the head index in the index register of the empty queue to a value of an index number corresponding to the sixth task descriptor entry; and if a value of a tail index in the index register of the empty queue is null, modifying the value of the tail index in the index register of the empty queue to the value of the index number corresponding to the sixth task descriptor entry.

In a fifth possible implementation manner, with reference to the first possible implementation manner of the first aspect, when the value of the head index in the index register of the empty queue is null, the method further includes newly creating a fourth task descriptor structure in an external memory; modifying a value of a process descriptor pointer in the fourth task descriptor structure to the value of the fourth process descriptor pointer; modifying a value of a next task pointer in the fourth task descriptor structure to a value of an external linked list pointer in an index register with the fourth priority; and modifying the value of the external linked list pointer in the index register with the fourth priority to an address of the fourth task descriptor structure.

In a sixth possible implementation manner, with reference to the second possible implementation manner of the first aspect, if the fifth task descriptor entry is not obtained, the method further includes obtaining a linked list of a descriptor structure of a task with the fifth priority according to a value of an external linked list pointer in an index register with the fifth priority, where the linked list of the descriptor structure of the task with the fifth priority is corresponding to the value of the external linked list pointer; traversing the entire linked list of the descriptor structure of the task with the fifth priority to find a fifth task descriptor structure corresponding to the fifth process; and removing the fifth process from the linked list of the descriptor structure of the task with the fifth priority.

In a seventh possible implementation manner, with reference to the fourth possible implementation manner of the first aspect, when the value of the head index in the index register with the sixth priority is null, the method further includes obtaining a linked list of a descriptor structure of a task with the six priority according to a value of an external linked list pointer in the index register with the six priority, wherein the linked list of the descriptor structure of the task with the six priority is corresponding to the value of the external linked list pointer; and removing the sixth process from the sixth task descriptor structure linked list.

According to a second aspect, an apparatus for managing a task is provided, where the apparatus includes a unit for obtaining a first descriptor entry configured to obtain a corresponding first task descriptor entry according to a value of a head index in an index register of a first task queue, where the first task descriptor entry is corresponding to a first index number, the first index number is corresponding to the value of the head index, and the head index indicates the first index number corresponding to the first task descriptor entry of a first process at the beginning of the first task queue; a unit for obtaining a first process descriptor configured to obtain, according to a first process descriptor pointer in the first task descriptor entry, a first process descriptor corresponding to the first process, where the first process descriptor pointer points to an address of memory in which the first process descriptor is located; and a unit for obtaining a third process descriptor configured to obtain a corresponding second task descriptor entry according to a value of a next task index in the first task descriptor entry, and obtain, according to a second process descriptor pointer in the second task descriptor entry, a second process descriptor corresponding to a second process, until a third process descriptor corresponding to a value of a tail index in the index register of the first task queue is obtained, where the second task descriptor entry is corresponding to a second index number, the second index number is corresponding to the value of the next task index in the first task descriptor entry, and the tail index indicates a third index number corresponding to a third task descriptor entry of a third process at the end of the first task queue.

In a first possible implementation manner, with reference to the second aspect, if a fourth process needs to be inserted into a task queue corresponding to the fourth process, the apparatus further includes a module for obtaining a fourth process descriptor pointer and a fourth process priority configured to obtain a fourth process descriptor pointer and a fourth process priority of the fourth process; a module for inserting a fourth process descriptor pointer configured to obtain a fourth task descriptor entry corresponding to a value of a head index in an index register of an empty queue, and modify a value of a process descriptor pointer in the fourth task descriptor entry to a value of the fourth process descriptor pointer, where the index register of the empty queue is used to record a task queue in an idle state; a first empty queue modifying module configured to modify the value of the head index in the index register of the empty queue to a value of a next task index in the fourth task descriptor entry; and a module for inserting a fourth process configured to modify the value of the next task index in the fourth task descriptor entry to a value of a head index in an index register of a queue with a fourth priority corresponding to the fourth process priority; and modify the value of the head index in the index register of the queue with the fourth priority to an index number corresponding to the fourth task descriptor entry.

In a second possible implementation manner, with reference to the second aspect, if a fifth process needs to be deleted from a task queue corresponding to the fifth process, the apparatus further includes a module for obtaining a fifth process descriptor pointer and a fifth process priority configured to obtain a fifth process descriptor pointer and a fifth process priority of the fifth process; a module for obtaining a fifth task descriptor entry configured to traverse an entire queue with a fifth priority from a task descriptor entry that is corresponding to a value of a head index in an index register of the queue with the fifth priority corresponding to the fifth process priority, and obtain a fifth task descriptor entry corresponding to the fifth process; and a module for deleting a fifth process configured to remove the fifth process from the index register of the queue with the fifth priority.

In a third possible implementation manner, with reference to the second possible implementation manner of the second aspect, the module for deleting a fifth process is configured to, if the value of the head index or a value of a tail index in the index register of the queue with the fifth priority is corresponding to an index number of the fifth task descriptor entry corresponding to the fifth process, modify the value of the head index or the value of the tail index in the index register of the queue with the fifth priority to a value of a next task index in the fifth task descriptor entry corresponding to the fifth process; or if the value of the head index or a value of a tail index in the index register of the queue with the fifth priority is not corresponding to an index number of the fifth task descriptor entry corresponding to the fifth process, modify a value of a next task index in the fifth task descriptor entry to a value of a head index in an index register of an empty queue, modify the value of the head index in the index register of the empty queue to the index number corresponding to the fifth task descriptor entry, and if a value of a tail index in the index register of the empty queue is null, modify the value of the tail index in the index register of the empty queue to the index number corresponding to the fifth task descriptor entry.

In a fourth possible implementation manner, with reference to the second aspect, when a processor core needs to run a sixth process, the apparatus further includes a module for obtaining a register with a highest priority configured to obtain, among index registers with all priorities, an index register with a sixth priority that is a highest priority, where a value of a head index in the index register with the sixth priority is not null; a module for obtaining a sixth task descriptor entry configured to obtain a sixth task descriptor entry corresponding to the value of the head index in the index register with the sixth priority; and a module for removing a sixth process configured to modify the value of the head index in the index register with the sixth priority to a value of a next task index in the sixth task descriptor entry; modify the value of the next task index in the sixth task descriptor entry to a value of a head index in an index register of an empty queue; modify the value of the head index in the index register of the empty queue to a value of an index number corresponding to the sixth task descriptor entry; and if a value of a tail index in the index register of the empty queue is null, modify the value of the tail index in the index register of the empty queue to the value of the index number corresponding to the sixth task descriptor entry.

In a fifth possible implementation manner, with reference to the first possible implementation manner of the second aspect, when the value of the head index in the index register of the empty queue is null, the apparatus further includes a module for creating a fourth task descriptor structure configured to newly create a fourth task descriptor structure in an external memory; where the module for inserting a fourth process descriptor pointer is configured to modify a value of a process descriptor pointer in the fourth task descriptor structure to the value of the fourth process descriptor pointer; and the module for inserting a fourth process is configured to modify a value of a next task pointer in the fourth task descriptor structure to a value of an external linked list pointer in an index register with the fourth priority; and modify the value of the external linked list pointer in the index register with the fourth priority to an address of the fourth task descriptor structure.

In a sixth possible implementation manner, with reference to the second possible implementation manner of the second aspect, if the fifth task descriptor entry is not obtained, the apparatus further includes a module for obtaining a descriptor structure of a task with a fifth priority configured to obtain a linked list of a descriptor structure of a task with the fifth priority according to a value of an external linked list pointer in an index register with the fifth priority, where the linked list of the descriptor structure of the task with the fifth priority is corresponding to the value of the external linked list pointer; and traverse the entire linked list of the descriptor structure of the task with the fifth priority to find a fifth task descriptor structure corresponding to the fifth process; where the module for deleting a fifth process is configured to remove the fifth process from the linked list of the descriptor structure of the task with the fifth priority.

In a seventh possible implementation manner, with reference to the fourth possible implementation manner of the second aspect, when the value of the head index in the index register with the sixth priority is null, the apparatus further includes a module for obtaining a sixth task descriptor structure linked list configured to obtain, according to a value of an external linked list pointer in the index register with the sixth priority, a sixth task descriptor structure linked list corresponding to the value of the external linked list pointer; where the module for removing a sixth process is configured to remove the sixth process from the sixth task descriptor structure linked list.

According to the method and the apparatus for managing a task of a many-core system provided in the embodiments of the present disclosure, in the many-core system, a system task is scheduled and managed by the apparatus for managing a task. When a process needs to be added to a task linked list, a process descriptor pointer of the process is added to a task descriptor entry corresponding to the process, and the task descriptor entry is added to the task linked list; if a process needs to be deleted, a task descriptor entry corresponding to the process is found, and the task descriptor entry is removed from the task linked list; and when a processor core needs to run a new task, an available priority index register with a highest priority is removed from a queue of the priority index register. In the many-core system, the system task can be scheduled and managed by the apparatus for managing a task, which improves process management efficiency in the many-core system.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure.

An application scenario of the embodiments of the present disclosure is a many-core system, where the many-core system includes at least two processor cores. In the present disclosure, dedicated hardware, that is, an apparatus for managing a task, is added to the many-core system to improve process management efficiency in the many-core system, where the apparatus for managing a task is connected to each of the processor cores in the many-core system using a network-on-chip. The following describes a method provided in an embodiment of the present disclosure.

Figure 1:
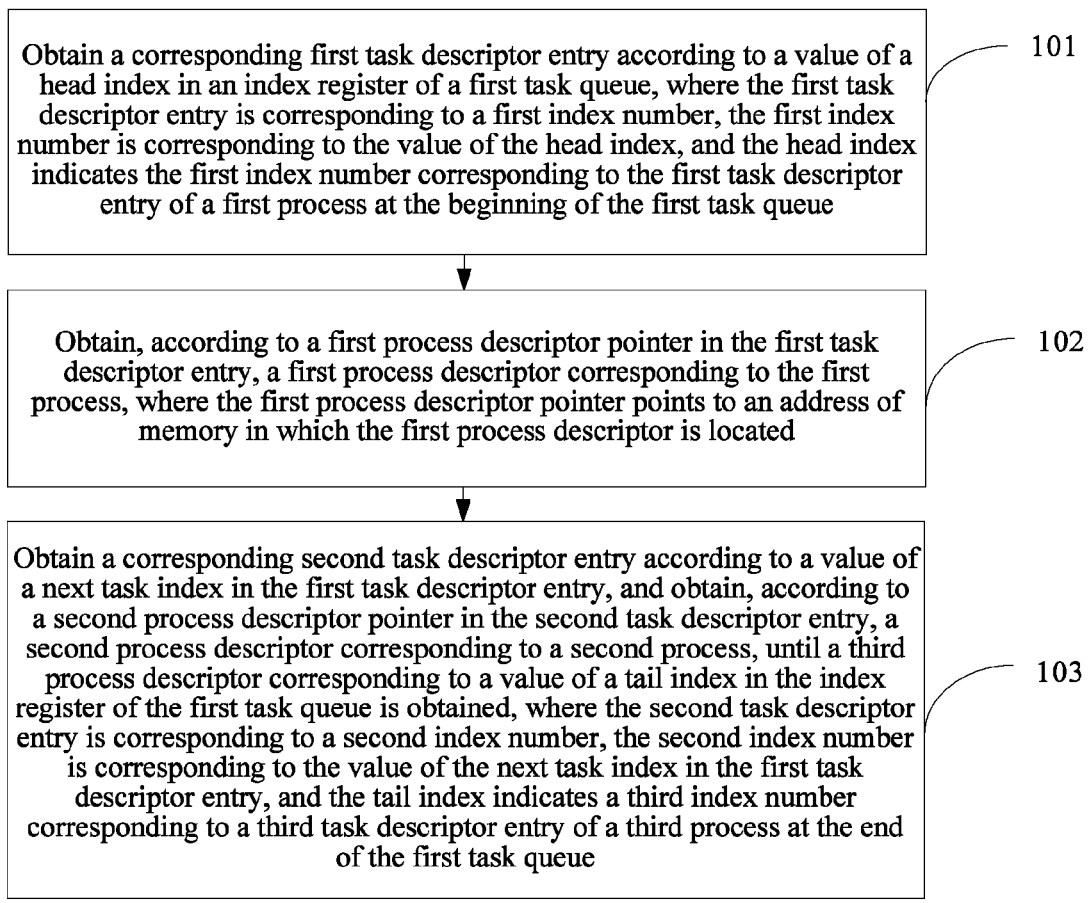
FIG. 1 is a schematic flowchart 1 of a method for managing a task of a many-core system according to an embodiment of the present disclosure.

An embodiment of the present disclosure provides a method for managing a task of a many-core system. As shown in FIG. 1, when a task descriptor entry corresponding to a process is to be inserted into a task linked list, the method includes:

Step 101: Obtain a corresponding first task descriptor entry according to a value of a head index in an index register of a first task queue, where the first task descriptor entry is corresponding to a first index number, the first index number is corresponding to the value of the head index, and the head index indicates the first index number corresponding to the first task descriptor entry of a first process at the beginning of the first task queue.

Step 102: Obtain, according to a first process descriptor pointer in the first task descriptor entry, a first process descriptor corresponding to the first process, where the first process descriptor pointer points to an address of memory in which the first process descriptor is located.

Step 103: Obtain a corresponding second task descriptor entry according to a value of a next task index in the first task descriptor entry, and obtain, according to a second process descriptor pointer in the second task descriptor entry, a second process descriptor corresponding to a second process, until a third process descriptor corresponding to a value of a tail index in the index register of the first task queue is obtained, where the second task descriptor entry is corresponding to a second index number, the second index number is corresponding to the value of the next task index in the first task descriptor entry, and the tail index indicates a third index number corresponding to a third task descriptor entry of a third process at the end of the first task queue.

According to the method for managing a task of a many-core system provided in this embodiment of the present disclosure, in the many-core system, a system task is scheduled and managed by an apparatus for managing a task. When a process needs to be added to a task linked list, a process descriptor pointer of the process is added to a task descriptor entry corresponding to the process, and the task descriptor entry is added to the task linked list; if a process needs to be deleted, a task descriptor entry corresponding to the process is found, and the task descriptor entry is removed from the task linked list; and when a processor core needs to run a new task, an available priority index register with a highest priority is removed from a queue of the priority index register. In the many-core system, the system task can be scheduled and managed by the apparatus for managing a task, which improves process management efficiency in the many-core system.

Figure 2:
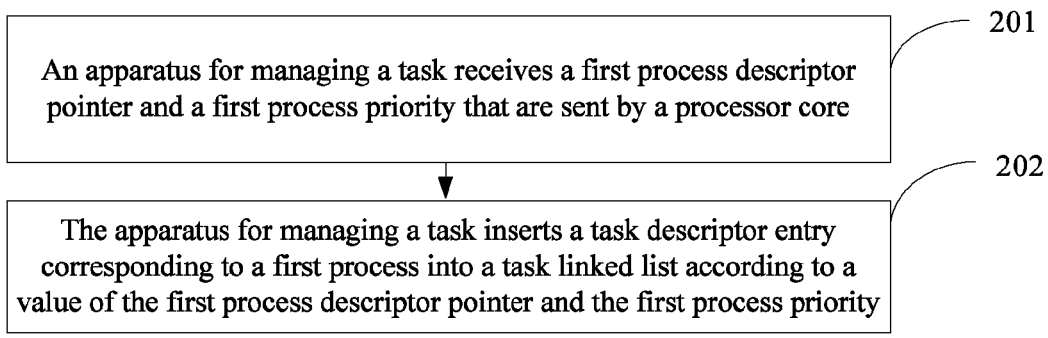
FIG. 2 is a schematic flowchart 2 of a method for managing a task of a many-core system according to an embodiment of the present disclosure.

To make a person skilled in the art more clearly understand technical solutions provided in the embodiments of the present disclosure, the following describes in detail, using specific embodiments, another method for managing a task of a many-core system according to an embodiment of the present disclosure. When a first process needs to be added to a task queue, as shown in FIG. 2, the method includes:

Step 201: An apparatus for managing a task receives a first process descriptor pointer and a first process priority that are sent by a processor core.

This step may be implemented in the following manner.

When an operating system needs to create a first process, or an operating system determines that a first process is in a ready state, or a time specified for a time slice of a first process that is running expires, the operating system returns a process descriptor pointer corresponding to the first process and a process priority corresponding to the first process to a current processor core; and the processor core sends the received process descriptor pointer corresponding to the first process and the received process priority corresponding to the first process to the apparatus for managing a task.

Exemplarily, it is assumed that the first process needs to be created, the process descriptor pointer of the first process is a first pointer, and the priority of the first process is 0; in this case, the operating system returns the first pointer and the priority 0 to the current processor core, and the current processor core sends the first pointer and the priority 0 to the apparatus for managing a task.

Step 202: The apparatus for managing a task inserts a task descriptor entry corresponding to a first process into a task linked list according to a value of the first process descriptor pointer and the first process priority.

The following steps may be included.

The apparatus for managing a task first obtains a task descriptor entry corresponding to a value of a head index in an index register of an empty queue, modifies a value of a process descriptor pointer in the task descriptor entry corresponding to the value of the head index in the index register of the empty queue to the value of the first process descriptor pointer received by the apparatus for managing a task, and then modifies the value of the head index in the index register of the empty queue to a value of a next task index in the task descriptor entry corresponding to the value of the head index in the index register of the empty queue; and modifies the value of the next task index in the task descriptor entry corresponding to the value of the head index in the index register of the empty queue to a value of a head index in a priority index register corresponding to the priority received by the apparatus for managing a task, and finally modifies the value of the head index in the priority index register corresponding to the priority received by the apparatus for managing a task to a value of an index number that is corresponding to the task descriptor entry corresponding to the value of the head index in the index register of the empty queue.

Figure 3:
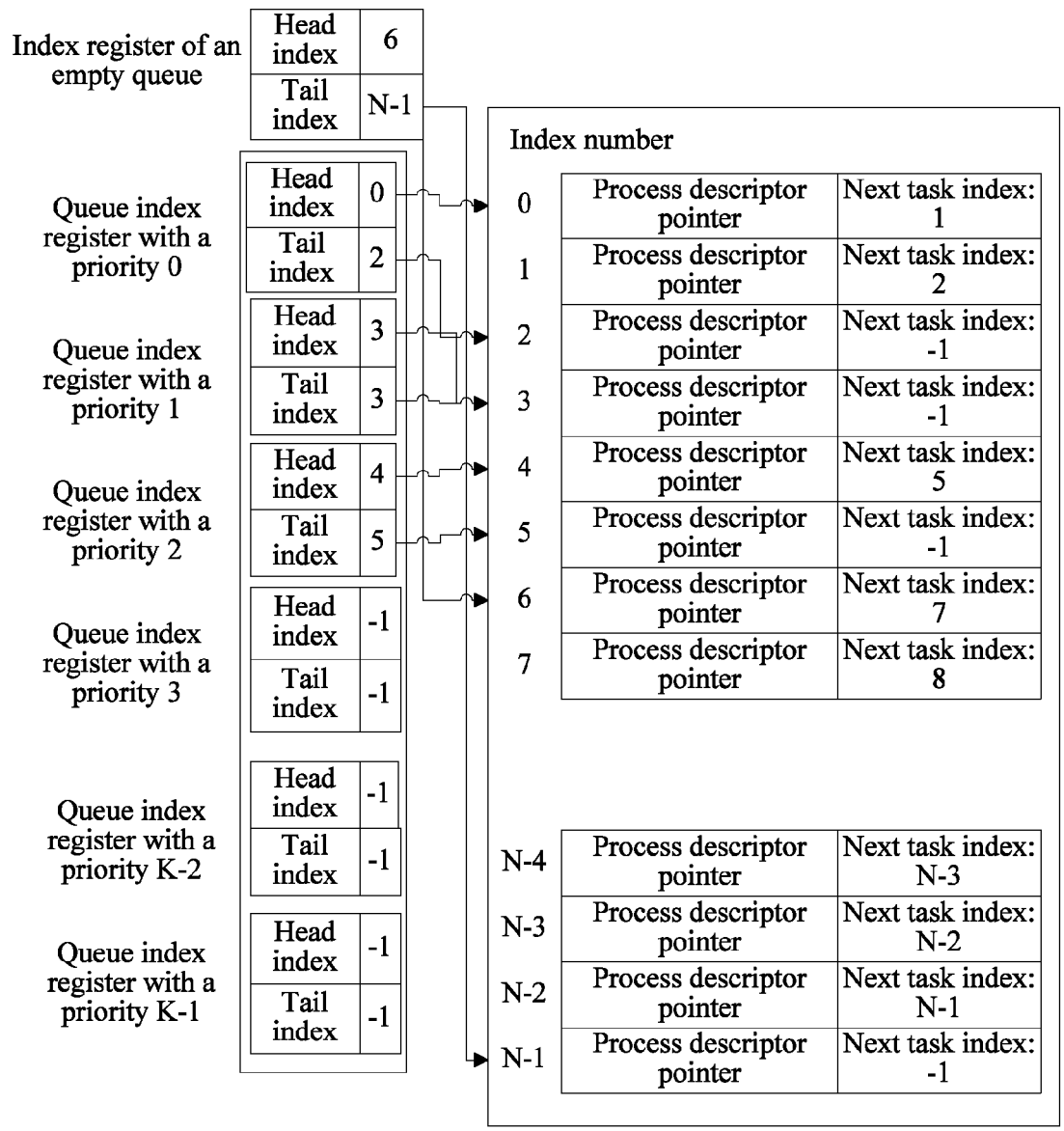
FIG. 3 is a schematic structural diagram 1 of an apparatus for managing a task according to an embodiment of the present disclosure.
Figure 4:
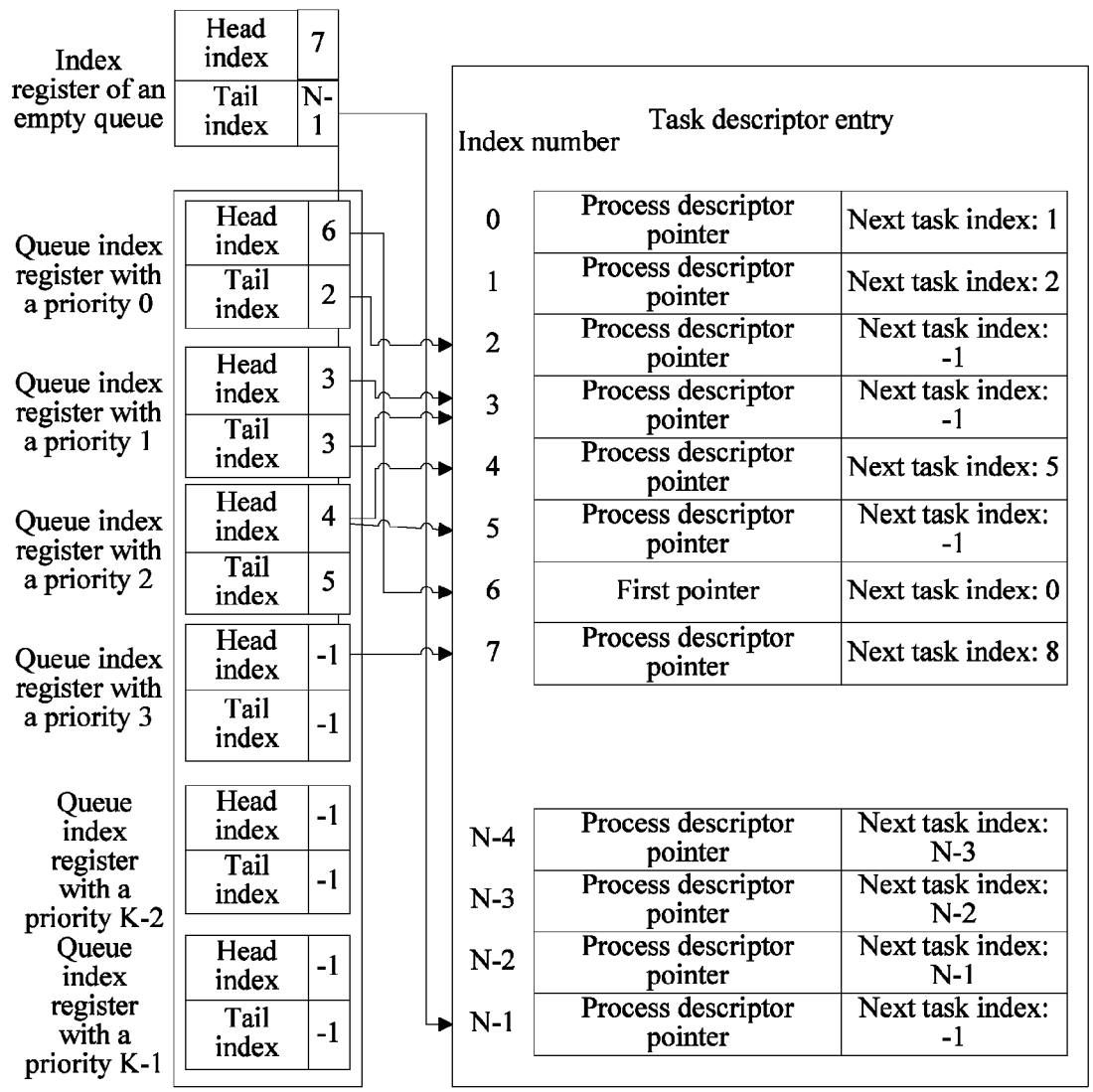
FIG. 4 is a schematic structural diagram 2 of an apparatus for managing a task according to an embodiment of the present disclosure.

Exemplarily, as shown in FIG. 3, after receiving the first pointer and the priority 0, because the value of the head index in the index register of the empty queue is 6 at present, the apparatus for managing a task modifies a value of a process descriptor pointer in a task descriptor entry whose index number is 6 to the value of the first pointer, and modifies the value 6 of the head index in the index register of the empty queue to 7, that is, to a value 7 of a next task index in the task descriptor entry whose index number is 6; and modifies the value 7 of the next task index in the task descriptor entry whose index number is 6 to 0, that is, to a value 0 of a head index in a queue index register with the priority 0, and then modifies the value 0 of the head index in the queue index register with the priority 0 to 6, that is, to the initial index number 6 of the task descriptor entry corresponding to the value of the head index in the index register of the empty queue. A structure obtained after the modification is shown in FIG. 4.

Figure 5:
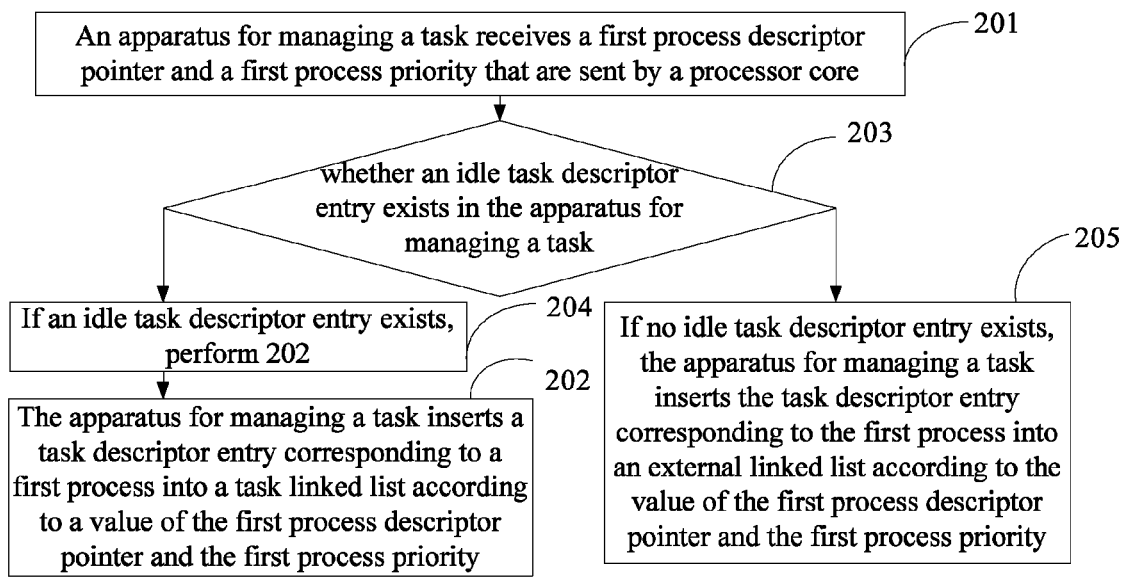
FIG. 5 is a schematic flowchart 3 of a method for managing a task of a many-core system according to an embodiment of the present disclosure.

When each task is corresponding to one task descriptor entry in the apparatus for managing a task, the apparatus for managing a task requires a relatively high overhead; therefore, preferably, a dedicated off-chip memory may be added, a small quantity of task descriptor entries are stored in the apparatus for managing a task, and most task descriptor entries are stored in the off-chip memory, where when a task descriptor entry is stored in the off-chip memory, the task descriptor entry is referred to as a task descriptor structure; in this case, before step 202, as shown in FIG. 5, the following may further be included.

Step 203: The apparatus for managing a task first determines whether an idle task descriptor entry exists in the apparatus for managing a task.

Step 204: If an idle task descriptor entry exists, perform 202.

Step 205: If no idle task descriptor entry exists, the apparatus for managing a task inserts the task descriptor entry corresponding to the first process into an external linked list according to the value of the first process descriptor pointer and the first process priority.

The following steps may be included.

The apparatus for managing a task newly creates a task descriptor structure in the off-chip memory, modifies a value of a process descriptor pointer in the newly created task descriptor structure to the value of the first process descriptor pointer, modifies a value of a next task pointer in the newly created task descriptor structure to a value of an external linked list pointer in an index register with a corresponding priority, and modifies the value of the external linked list pointer in the index register with the corresponding priority to an address of the newly created task descriptor structure.

The external linked list is a task linked list that is in the off-chip memory and outside the apparatus for managing a task.

Figure 6:
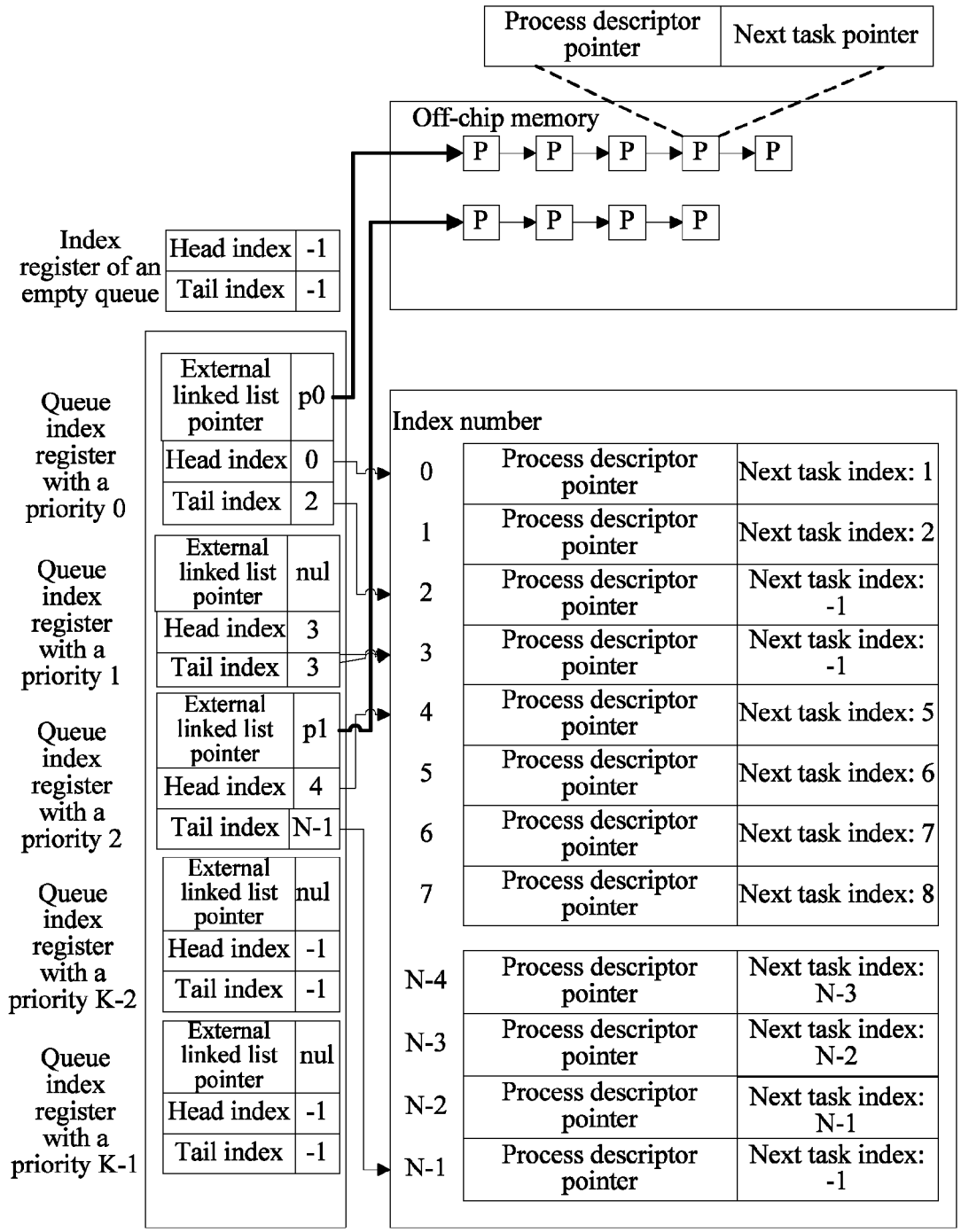
FIG. 6 is a schematic structural diagram 3 of an apparatus for managing a task according to an embodiment of the present disclosure.
Figure 7:
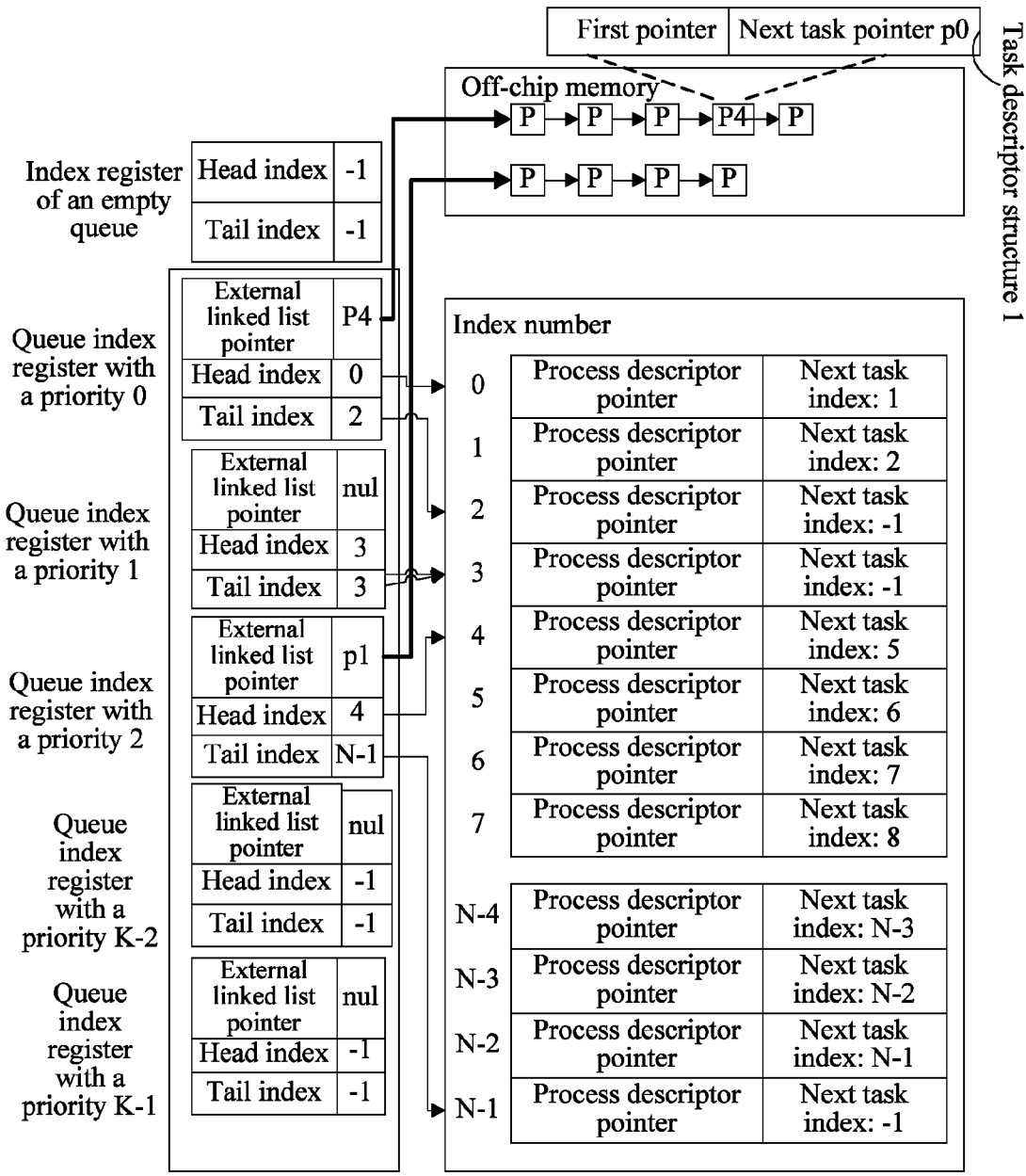
FIG. 7 is a schematic structural diagram 4 of an apparatus for managing a task according to an embodiment of the present disclosure.

Exemplarily, as shown in FIG. 6, when the first process needs to be created, the value of the head index in the index register of the empty queue is −1, which indicates that no idle task descriptor entry exists in the apparatus for managing a task; in this case, the apparatus for managing a task creates a task descriptor structure 1 in the off-chip memory, sets a task descriptor pointer in the task descriptor structure 1 as the first pointer, modifies a next task pointer in the task descriptor structure 1 to p0, that is, to a value p0 of an external linked list pointer in a register with the priority 0, and finally modifies the value p0 of the external linked list pointer in the register with the priority 0 to an address p4 of the newly created task descriptor structure. A structure obtained after the modification is shown in FIG. 7.

Figure 8:
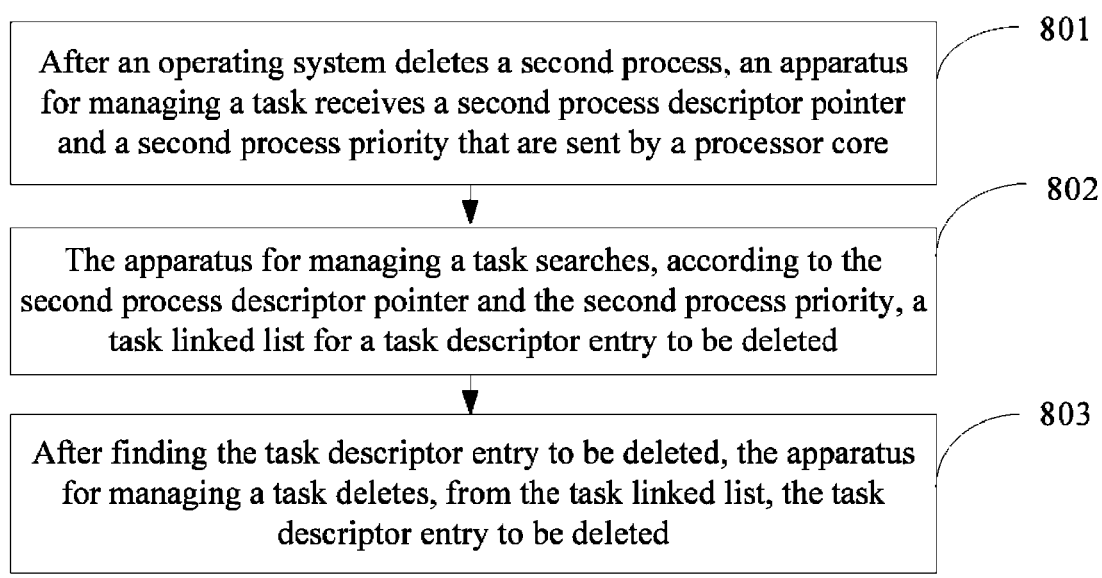
FIG. 8 is a schematic flowchart 4 of a method for managing a task of a many-core system according to an embodiment of the present disclosure.

In another case, if the operating system deletes a process such as a second process, as shown in FIG. 8, the method for managing a task of a many-core system further includes:

Step 801: After the operating system deletes the second process, the apparatus for managing a task receives a second process descriptor pointer and a second process priority that are sent by a processor core.

This step may be implemented in the following manner.

After the operating system deletes the second process, the operating system returns a process descriptor pointer corresponding to the second process and a process priority corresponding to the second process to a current processor core, and the processor core sends the received process descriptor pointer corresponding to the second process and the received process priority corresponding to the second process to the apparatus for managing a task.

Exemplarily, it is assumed that after the operating system deletes the second process, the process descriptor pointer of the second process is a second pointer, and the priority of the second process is 1; in this case, the operating system returns the second pointer and the priority 1 to the current processor core, and the current processor core sends the second pointer and the priority 1 to the apparatus for managing a task.

Step 802: The apparatus for managing a task searches, according to the second process descriptor pointer and the second process priority, a task linked list for a task descriptor entry to be deleted.

This step may be implemented in the following manner.

The apparatus for managing a task accesses a priority index register corresponding to the priority of the second process, and traverses a task queue with the corresponding priority according to a value of a head index in the priority index register corresponding to the priority of the second process, so as to search for the task descriptor entry to be deleted.

Figure 9:
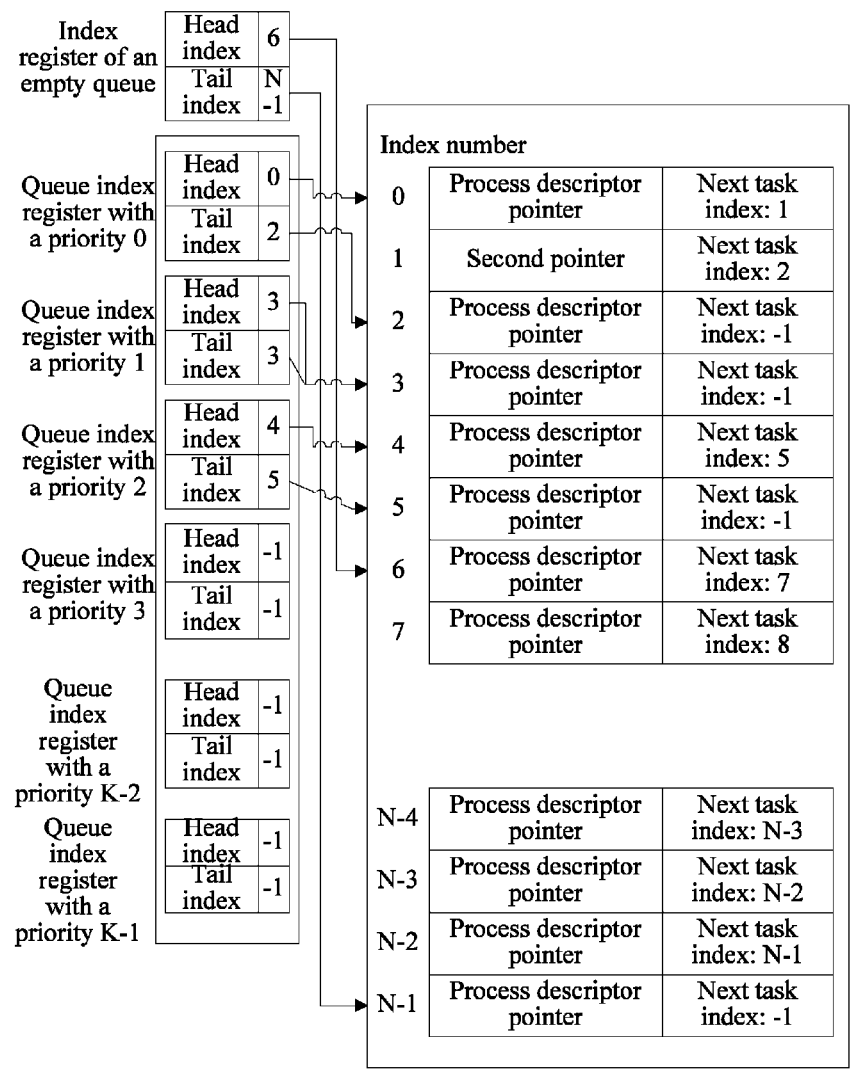
FIG. 9 is a schematic structural diagram 5 of an apparatus for managing a task according to an embodiment of the present disclosure.

Exemplarily, as shown in FIG. 9, after the system deletes the second process, the apparatus for managing a task traverses the task queue with the corresponding priority according to the value of the head index in the priority index register corresponding to the priority of the second process, that is, starts to search from an index number 0 until a task descriptor entry whose index number is 1 is found, where the task descriptor entry whose index number is 1 is a task descriptor entry corresponding to the second process.

Step 803: After finding the task descriptor entry to be deleted, the apparatus for managing a task deletes, from the task linked list, the task descriptor entry to be deleted.

The following steps may be included.

If the value of the head index or a value of a tail index in the priority index register corresponding to the priority of the second process points to the task descriptor entry to be deleted, the apparatus for managing a task modifies the value of the head index or the value of the tail index in the priority index register corresponding to the priority of the second process to a value of a next task index in the task descriptor entry to be deleted; or if a value of a next task index in another task descriptor entry points to the task descriptor entry to be deleted, the apparatus for managing a task modifies the value of the next task index in the another task descriptor entry to a value of a next task index in the task descriptor entry to be deleted; and the apparatus for managing a task modifies the value of the next task index in the task descriptor entry to be deleted to a value of a head index in an index register of an empty queue, and modifies the value of the head index in the index register of the empty queue to an index number corresponding to the task descriptor entry to be deleted, or modifies a value of a tail index in the index register of the empty queue to an index number corresponding to the task descriptor entry to be deleted.

Figure 10:
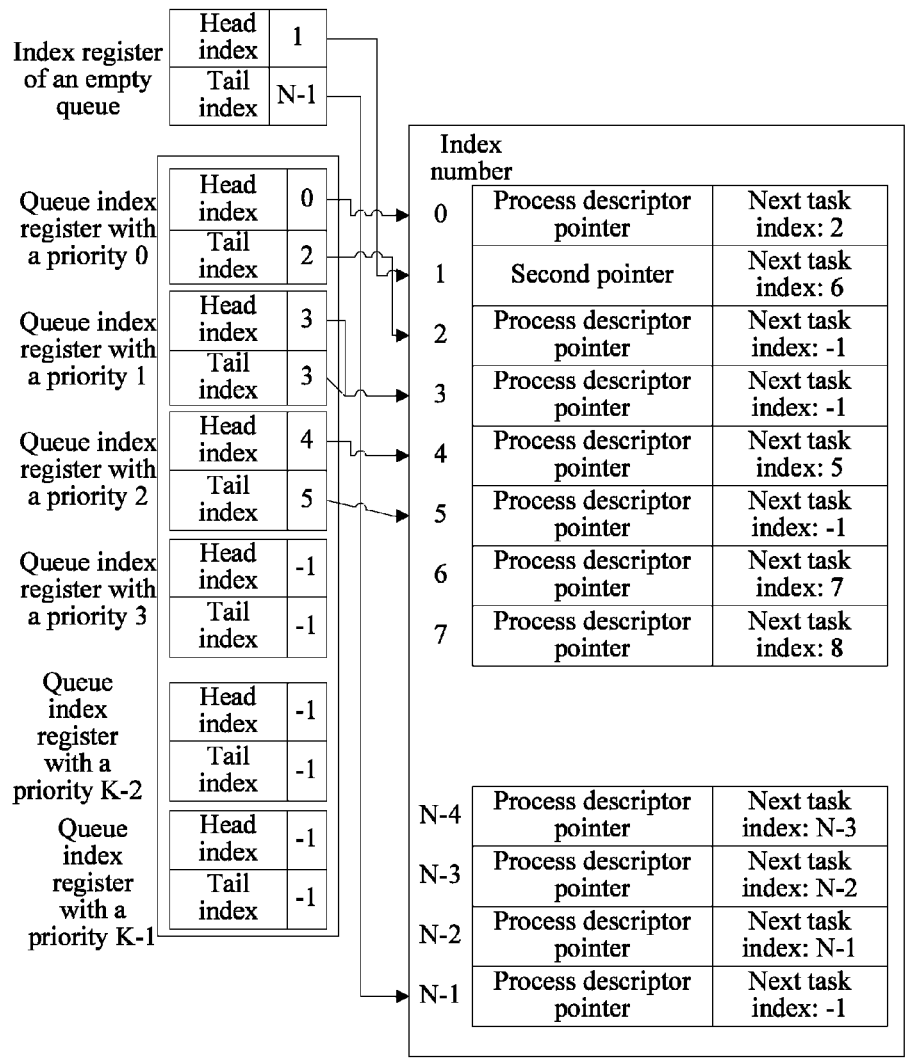
FIG. 10 is a schematic structural diagram 6 of an apparatus for managing a task according to an embodiment of the present disclosure.

Exemplarily, as shown in FIG. 9, the task descriptor entry whose index number is 1 is the descriptor entry corresponding to the second process, and a next task descriptor entry in a task descriptor entry whose index number is 0 is 1, that is, points to the task descriptor entry whose index number is 1 and that is corresponding to the second process; in this case, a value of a next task index in the task descriptor entry whose index number is 0 needs to be modified from 1 to 2, that is, to a value of a next task index in the task descriptor entry corresponding to the second process; and finally the value 2 of the next task index in the task descriptor entry whose index number is 1 is modified to 6, that is, to the value 6 of the head index in the index register of the empty queue, and the value 6 of the head index in the index register of the empty queue is modified to 1, that is, to the index number 1 that is corresponding to the task descriptor entry corresponding to the second process. A structure obtained after the modification is shown in FIG. 10.

Figure 11:
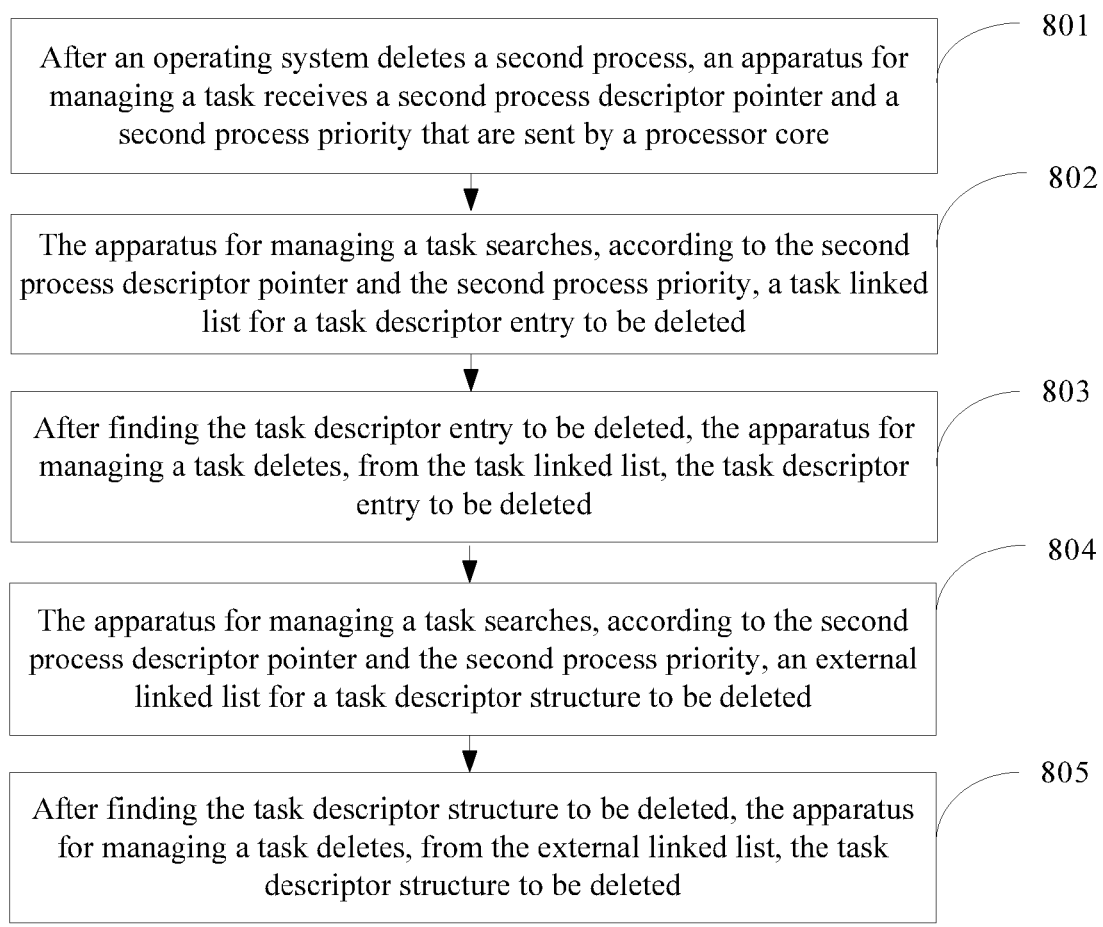
FIG. 11 is a schematic flowchart 5 of a method for managing a task of a many-core system according to an embodiment of the present disclosure.

Preferably, when a dedicated off-chip memory is added to the apparatus for managing a task, the apparatus for managing a task may be incapable of finding, in the task linked list, the task descriptor entry to be deleted, and in this case, the apparatus for managing a task needs to search an external linked list. In this case, as shown in FIG. 11, the foregoing method may further include:

Step 804: The apparatus for managing a task searches, according to the second process descriptor pointer and the second process priority, an external linked list for a task descriptor structure to be deleted.

This step may be implemented in the following manner.

The apparatus for managing a task accesses a task descriptor structure linked list with a corresponding priority in the off-chip memory according to a value of an external linked list pointer in the priority index register corresponding to the priority of the second process, so as to search for the task descriptor structure to be deleted.

Step 805: After finding the task descriptor structure to be deleted, the apparatus for managing a task deletes, from the external linked list, the task descriptor structure to be deleted.

Figure 12:
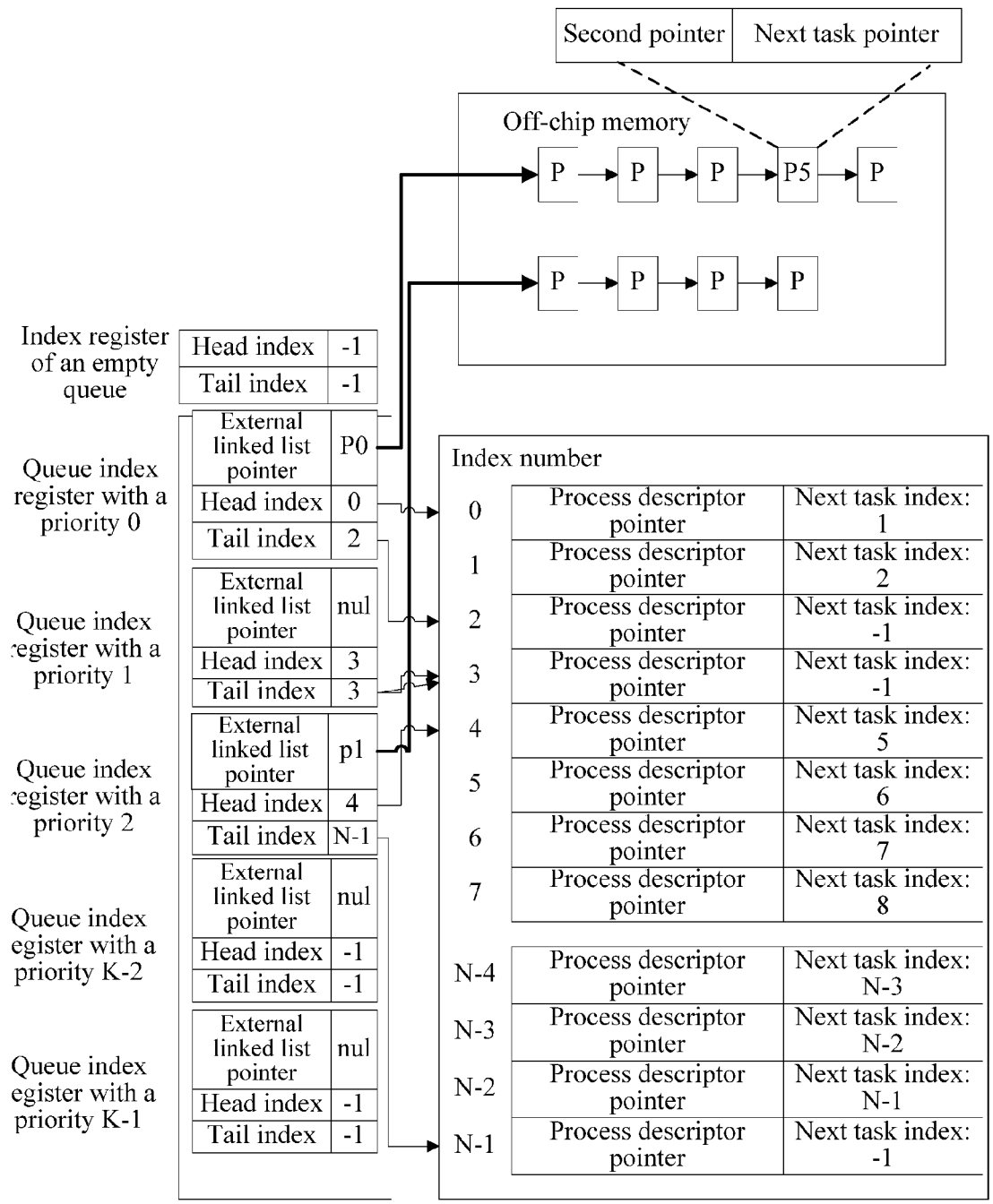
FIG. 12 is a schematic structural diagram 7 of an apparatus for managing a task according to an embodiment of the present disclosure.

Exemplarily, as shown in FIG. 12, the task descriptor entry corresponding to the second process is not found among task descriptor entries whose index numbers are 0 to 2, and in this case, the off-chip memory is searched, according to a value p0 of an external linked list pointer in a register with a priority 0, for a task descriptor structure corresponding to the second process.

Figure 13:
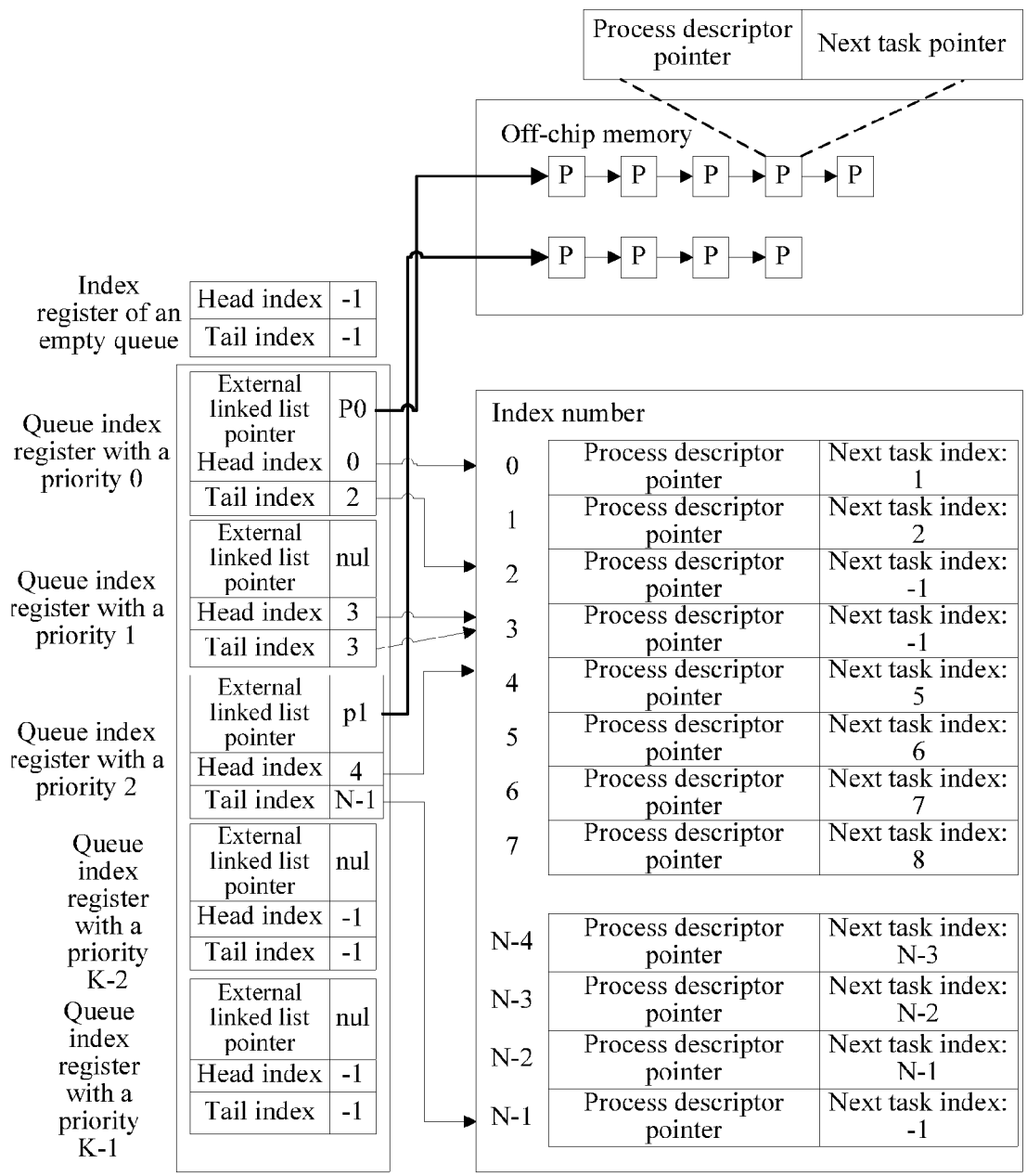
FIG. 13 is a schematic structural diagram 8 of an apparatus for managing a task according to an embodiment of the present disclosure.

It is assumed that the task descriptor structure p5 corresponding to the second process is found in an external memory, and in this case, p5 is deleted from the external memory. A structure obtained after the deletion is shown in FIG. 13.

Figure 14:
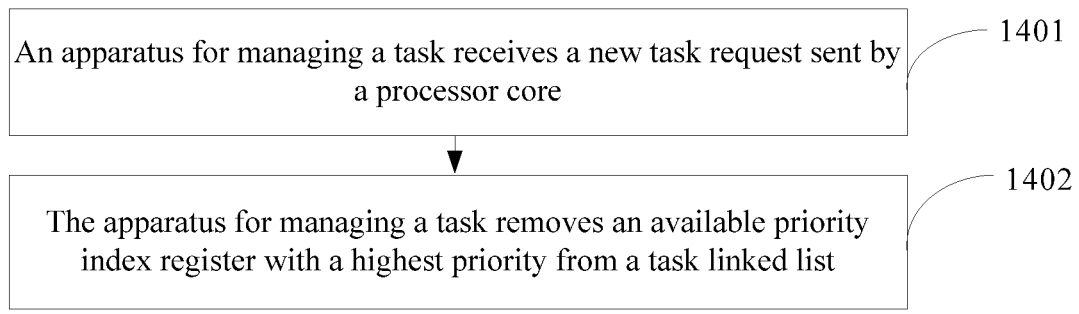
FIG. 14 is a schematic flowchart 6 of a method for managing a task of a many-core system according to an embodiment of the present disclosure.

In another case, if the apparatus for managing a task applies for a new task, as shown in FIG. 14, the method for managing a task of a many-core system further includes:

Step 1401: The apparatus for managing a task receives a new task request sent by a processor core.

Step 1402: The apparatus for managing a task removes an available priority index register with a highest priority from a task linked list.

This step may be implemented in the following manner: accessing a priority index register whose priority is the highest and a value of whose head index is not −1, determining a task descriptor entry corresponding to the priority index register, and modifying the value of the head index in the priority index register to a value of a next task index in the task descriptor entry corresponding to the priority index register; and modifying the value of the next task index in the task descriptor entry corresponding to the priority index register to a value of a head index in an index register of an empty queue, and modifying the value of the head index in the index register of the empty queue to an index number that is corresponding to the task descriptor entry corresponding to the priority index register, or modifying a value of a tail index in the index register of the empty queue to an index number that is corresponding to the task descriptor entry corresponding to the priority index register.

Figure 15:
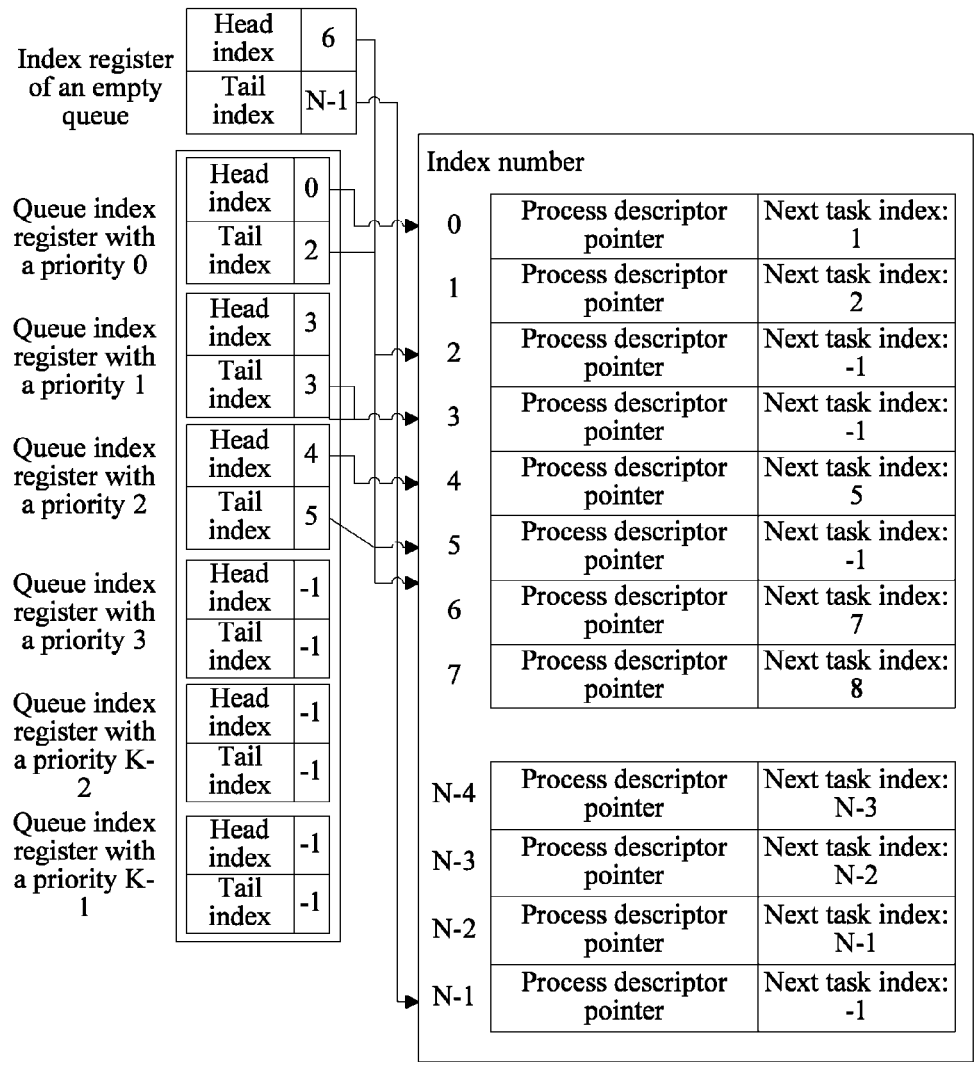
FIG. 15 is a schematic structural diagram 9 of an apparatus for managing a task according to an embodiment of the present disclosure.
Figure 16:
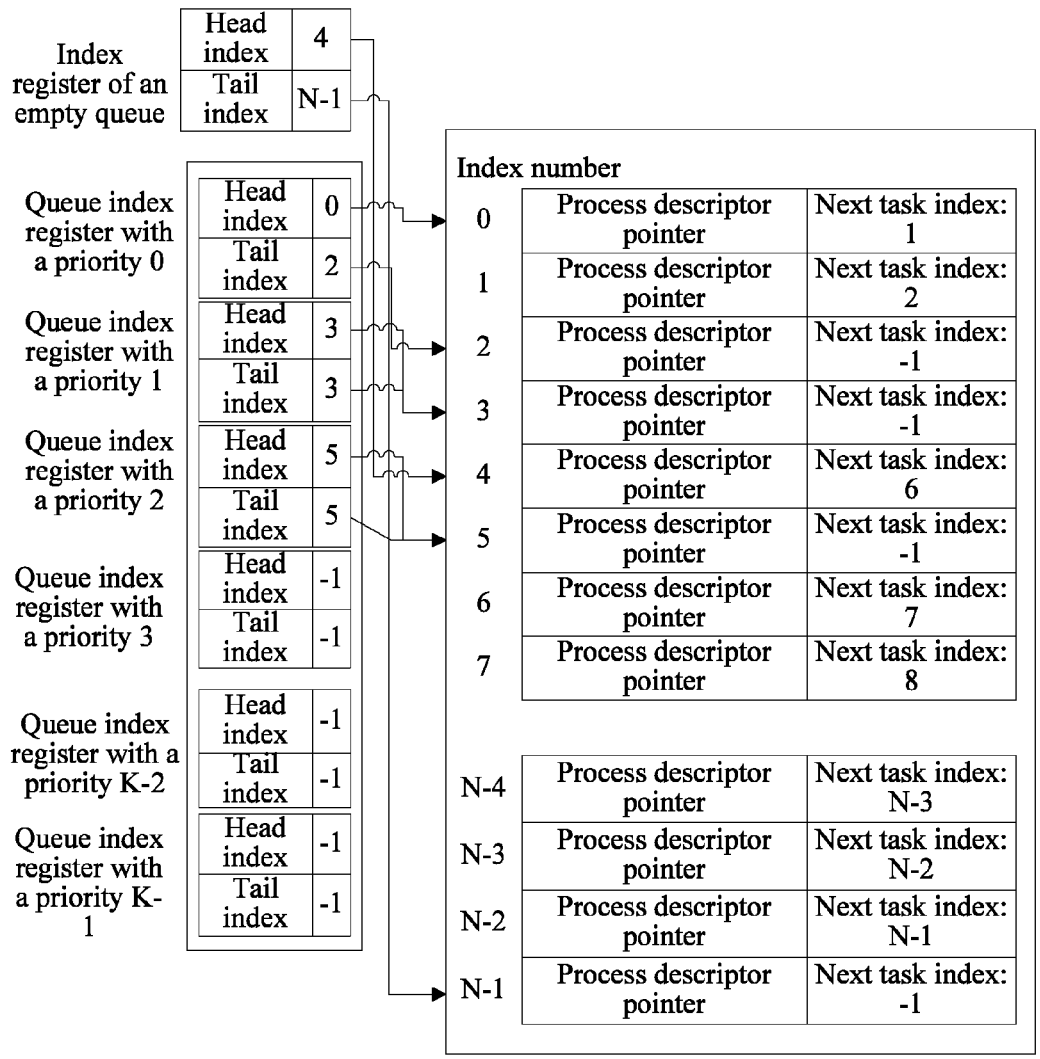
FIG. 16 is a schematic structural diagram 10 of an apparatus for managing a task according to an embodiment of the present disclosure.

Exemplarily, as shown in FIG. 15, when the processor core needs to run a new task, the apparatus for managing a task searches, among priority index registers, for the priority index register whose priority is the highest and the value of whose head index is not −1 currently; the priority index register whose priority is the highest and the value of whose head index is not −1 is an index register with a priority 2, and a descriptor entry to which the index register with the priority 2 points is a task descriptor entry whose index number is 4; in this case, the value 4 of the head index in the index register with the priority 2 is modified to 5, that is, to a value of a next task index in the task descriptor entry whose index number is 4; and then the value of the next task index in the task descriptor entry whose index number is 4 is modified to 6, that is, to the value 6 of the head index in the index register of the empty queue, and finally the value 6 of the head index in the index register of the empty queue is modified to 4, that is, to the index number 4 corresponding to the task descriptor entry whose index number is 4; if the value of the tail index in the index register of the empty queue is −1, the value of the tail index in the index register of the empty queue needs to be modified to 4; and the value of the tail index in the index register of the empty queue is N−1 herein, and therefore the value of the tail index in the index register of the empty queue does not need to be modified. A structure obtained after the modification is shown in FIG. 16.

Figure 17:
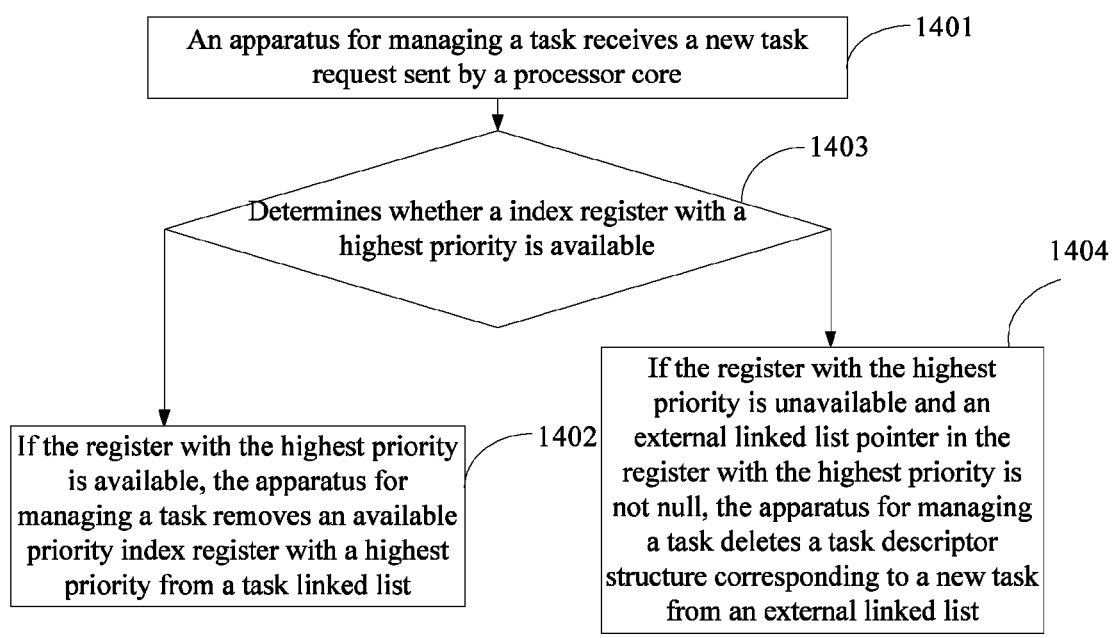
FIG. 17 is a schematic flowchart 7 of a method for managing a task of a many-core system according to an embodiment of the present disclosure.

Preferably, when a dedicated off-chip memory is added to the apparatus for managing a task, before step 1402, as shown in FIG. 17, the following may further be included:

Step 1403: The apparatus for managing a task determines whether a register with a highest priority is available, if the index register with the highest priority is available, performs 1402, and if the register with the highest priority is unavailable and an external linked list pointer in the register with the highest priority is not null, performs 1404.

Step 1404: The apparatus for managing a task deletes a task descriptor structure corresponding to the new task from an external linked list.

This step may be implemented in the following manner: accessing a descriptor structure linked list of a task with a corresponding priority according to an external linked list pointer in an index register with a highest priority, finding a task descriptor structure indicated by the external linked list pointer in the index register with the highest priority, and deleting the indicated task descriptor structure from the external linked list.

Figure 18:
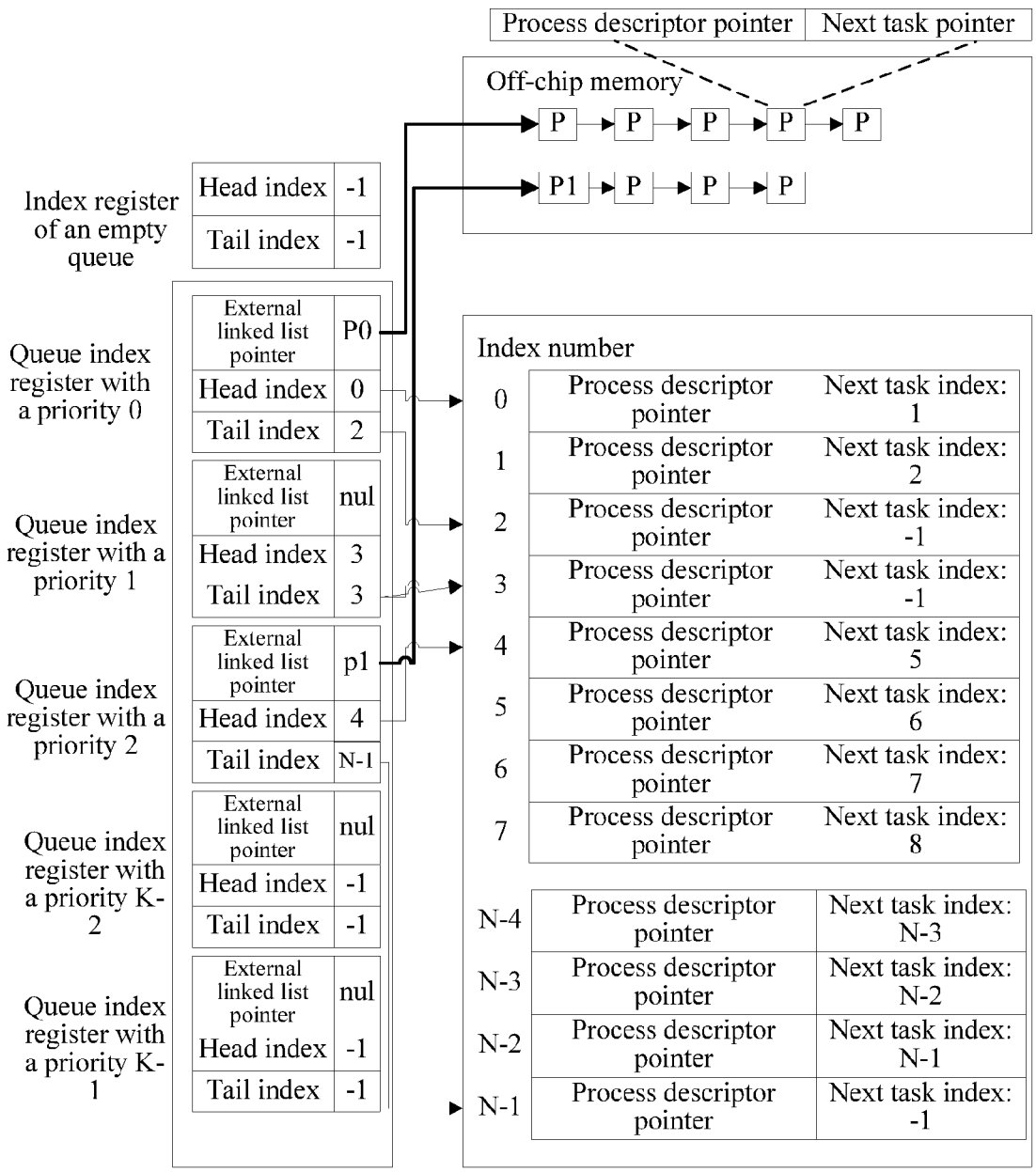
FIG. 18 is a schematic structural diagram 11 of an apparatus for managing a task according to an embodiment of the present disclosure.
Figure 19:
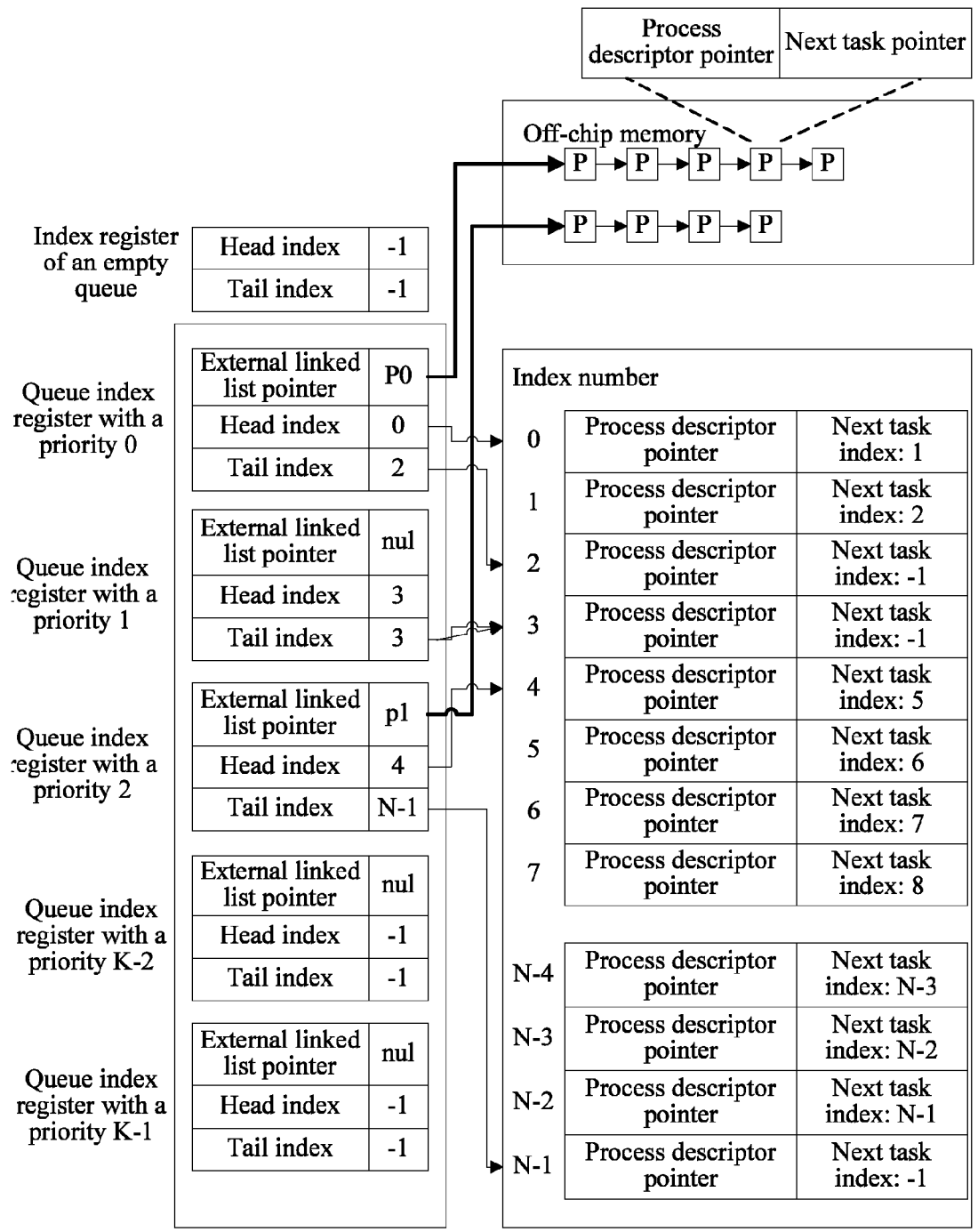
FIG. 19 is a schematic structural diagram 12 of an apparatus for managing a task according to an embodiment of the present disclosure.

Exemplarily, as shown in FIG. 18, a value of a head index in a priority index register whose priority is 2 is −1, and a value of an external linked list pointer in the priority index register whose priority is 2 is p1; in this case, a corresponding task descriptor structure linked list is found in the external linked list according to the external linked list pointer p1, a task descriptor structure p1 that needs to be deleted is found, and the task descriptor structure p1 is deleted from the task descriptor structure linked list. A structure obtained after the deletion is shown in FIG. 19.

According to the method for managing a task of a many-core system provided in this embodiment of the present disclosure, in the many-core system, a system task is scheduled and managed by an apparatus for managing a task. When a process needs to be added to a task linked list, a process descriptor pointer of the process is added to a task descriptor entry corresponding to the process, and the task descriptor entry is added to the task linked list; if a process needs to be deleted, a task descriptor entry corresponding to the process is found, and the task descriptor entry is removed from the task linked list; and when a processor core needs to run a new task, an available priority index register with a highest priority is removed from a queue of the priority index register. In the many-core system, the system task can be scheduled and managed by the apparatus for managing a task, which improves process management efficiency in the many-core system.

Figure 20:
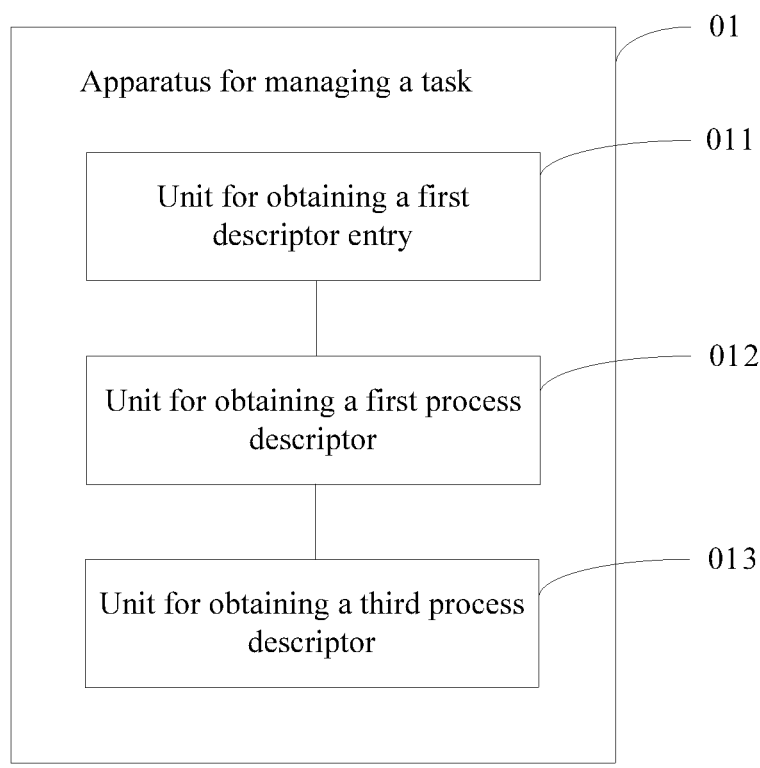
FIG. 20 is a schematic structural diagram 13 of an apparatus for managing a task according to an embodiment of the present disclosure.

An embodiment of the present disclosure provides an apparatus 01 for managing a task, and as shown in FIG. 20, the apparatus 01 for managing a task includes a unit 011 for obtaining a first descriptor entry configured to obtain a corresponding first task descriptor entry according to a value of a head index in an index register of a first task queue, where the first task descriptor entry is corresponding to a first index number, the first index number is corresponding to the value of the head index, and the head index indicates the first index number corresponding to the first task descriptor entry of a first process at the beginning of the first task queue; a unit 012 for obtaining a first process descriptor configured to obtain, according to a first process descriptor pointer in the first task descriptor entry, a first process descriptor corresponding to the first process, where the first process descriptor pointer points to an address of memory in which the first process descriptor is located; and a unit 013 for obtaining a third process descriptor configured to obtain a corresponding second task descriptor entry according to a value of a next task index in the first task descriptor entry, and obtain, according to a second process descriptor pointer in the second task descriptor entry, a second process descriptor corresponding to a second process, until a third process descriptor corresponding to a value of a tail index in the index register of the first task queue is obtained, where the second task descriptor entry is corresponding to a second index number, the second index number is corresponding to the value of the next task index in the first task descriptor entry, and the tail index indicates a third index number corresponding to a third task descriptor entry of a third process at the end of the first task queue.

Figure 21:
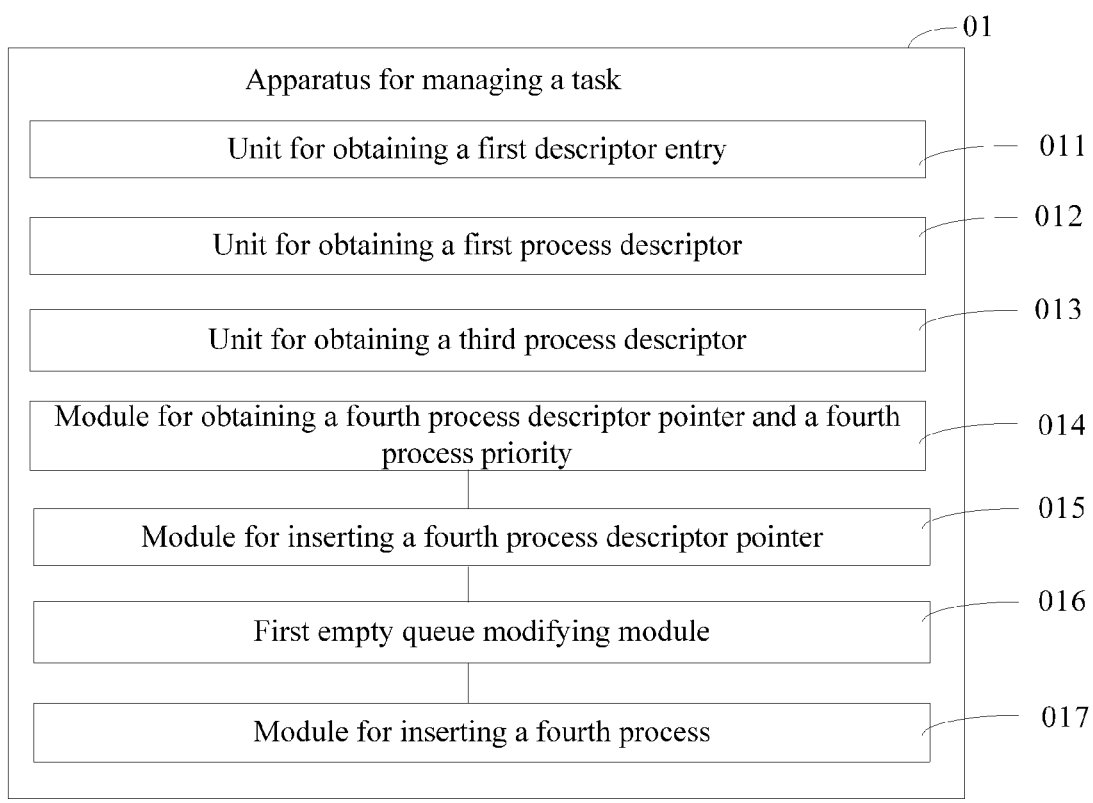
FIG. 21 is a schematic structural diagram 14 of an apparatus for managing a task according to an embodiment of the present disclosure.

Further, as shown in FIG. 21, if a fourth process needs to be inserted into a task queue corresponding to the fourth process, the apparatus 01 further includes a module 014 for obtaining a fourth process descriptor pointer and a fourth process priority configured to obtain a fourth process descriptor pointer and a fourth process priority of the fourth process; a module 015 for inserting a fourth process descriptor pointer configured to obtain a fourth task descriptor entry corresponding to a value of a head index in an index register of an empty queue, and modify a value of a process descriptor pointer in the fourth task descriptor entry to a value of the fourth process descriptor pointer, where the index register of the empty queue is used to record a task queue in an idle state; a first empty queue modifying module 016 configured to modify the value of the head index in the index register of the empty queue to a value of a next task index in the fourth task descriptor entry; and a module 017 for inserting a fourth process configured to modify the value of the next task index in the fourth task descriptor entry to a value of a head index in an index register of a queue with a fourth priority corresponding to the fourth process priority; and modify the value of the head index in the index register of the queue with the fourth priority to an index number corresponding to the fourth task descriptor entry.

Figure 22:
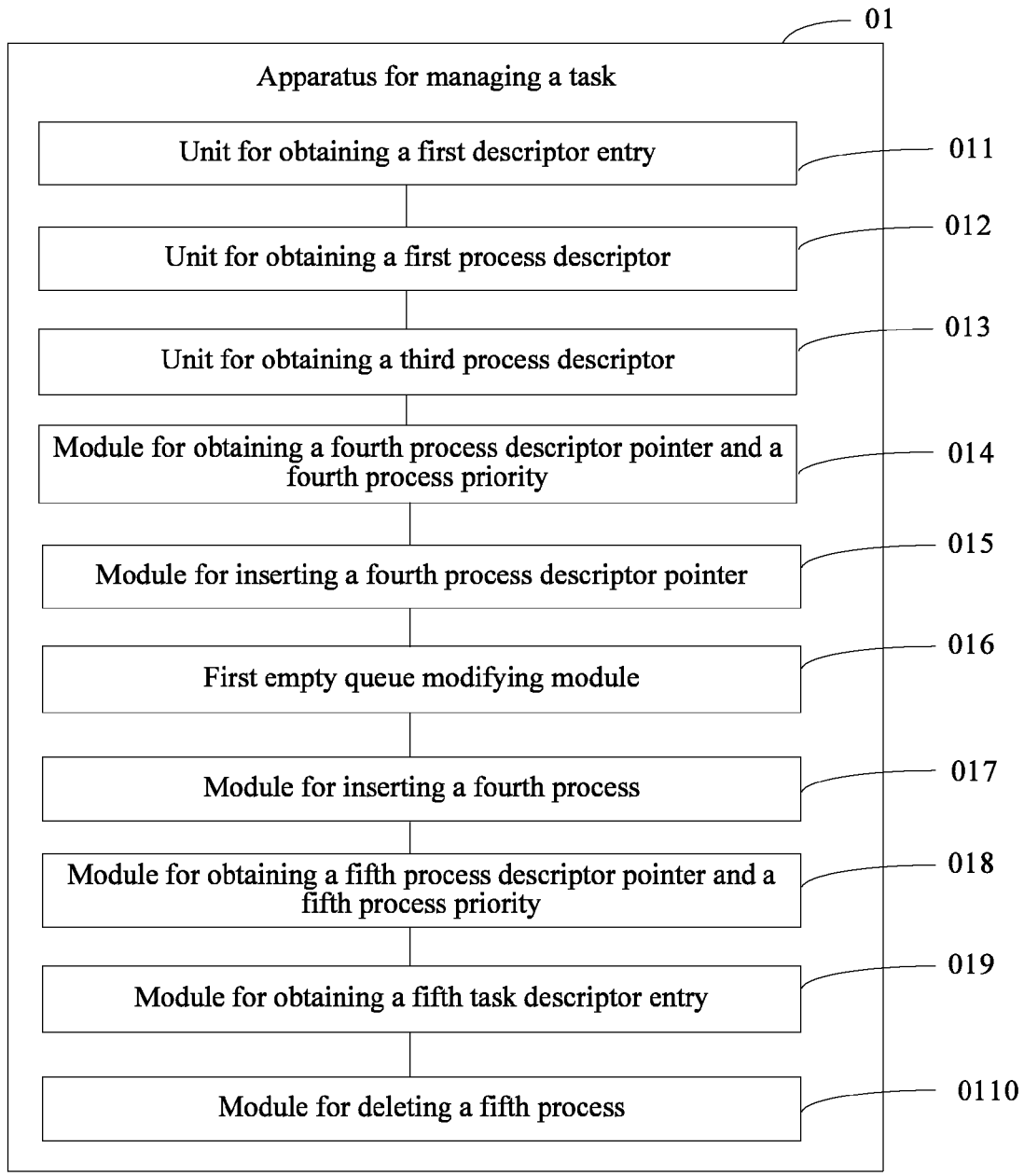
FIG. 22 is a schematic structural diagram 15 of an apparatus for managing a task according to an embodiment of the present disclosure.

Further, as shown in FIG. 22, if a fifth process needs to be deleted from a task queue corresponding to the fifth process, the apparatus 01 further includes a module 018 for obtaining a fifth process descriptor pointer and a fifth process priority configured to obtain a fifth process descriptor pointer and a fifth process priority of the fifth process; a module 019 for obtaining a fifth task descriptor entry configured to traverse an entire queue with a fifth priority from a task descriptor entry that is corresponding to a value of a head index in an index register of the queue with the fifth priority corresponding to the fifth process priority, and obtain a fifth task descriptor entry corresponding to the fifth process; and a module 0110 for deleting a fifth process configured to remove the fifth process from the index register of the queue with the fifth priority.

Further, the module 0110 for deleting a fifth process is configured to, if the value of the head index or a value of a tail index in the index register of the queue with the fifth priority is corresponding to an index number of the fifth task descriptor entry corresponding to the fifth process, modify the value of the head index or the value of the tail index in the index register of the queue with the fifth priority to a value of a next task index in the fifth task descriptor entry corresponding to the fifth process; or if the value of the head index or a value of a tail index in the index register of the queue with the fifth priority is not corresponding to an index number of the fifth task descriptor entry corresponding to the fifth process, modify a value of a next task index in the fifth task descriptor entry to a value of a head index in an index register of an empty queue, modify the value of the head index in the index register of the empty queue to the index number corresponding to the fifth task descriptor entry, and if a value of a tail index in the index register of the empty queue is null, modify the value of the tail index in the index register of the empty queue to the index number corresponding to the fifth task descriptor entry.

Figure 23:
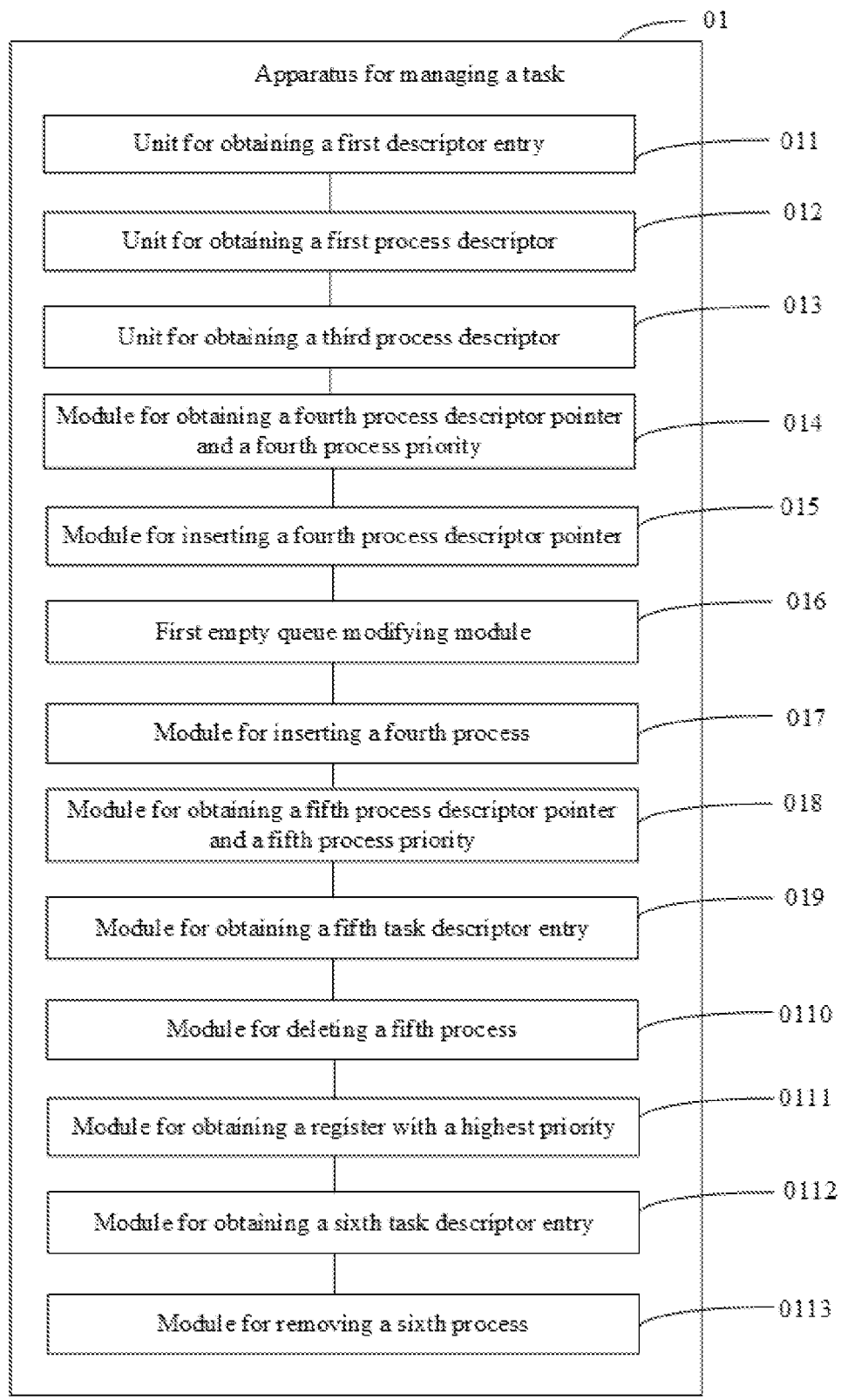
FIG. 23 is a schematic structural diagram 16 of an apparatus for managing a task according to an embodiment of the present disclosure.

Further, as shown in FIG. 23, when a processor core needs to run a sixth process, the apparatus 01 further includes a module 0111 for obtaining a register with a highest priority configured to obtain, among index registers with all priorities, an index register with a sixth priority that is a highest priority, where a value of a head index in the index register with the sixth priority is not null; a module 0112 for obtaining a sixth task descriptor entry configured to obtain a sixth task descriptor entry corresponding to the value of the head index in the index register with the sixth priority; and a module 0113 for removing a sixth process configured to modify the value of the head index in the index register with the sixth priority to a value of a next task index in the sixth task descriptor entry; modify the value of the next task index in the sixth task descriptor entry to a value of a head index in an index register of an empty queue; modify the value of the head index in the index register of the empty queue to a value of an index number corresponding to the sixth task descriptor entry; and if a value of a tail index in the index register of the empty queue is null, modify the value of the tail index in the index register of the empty queue to the value of the index number corresponding to the sixth task descriptor entry.

Figure 24:
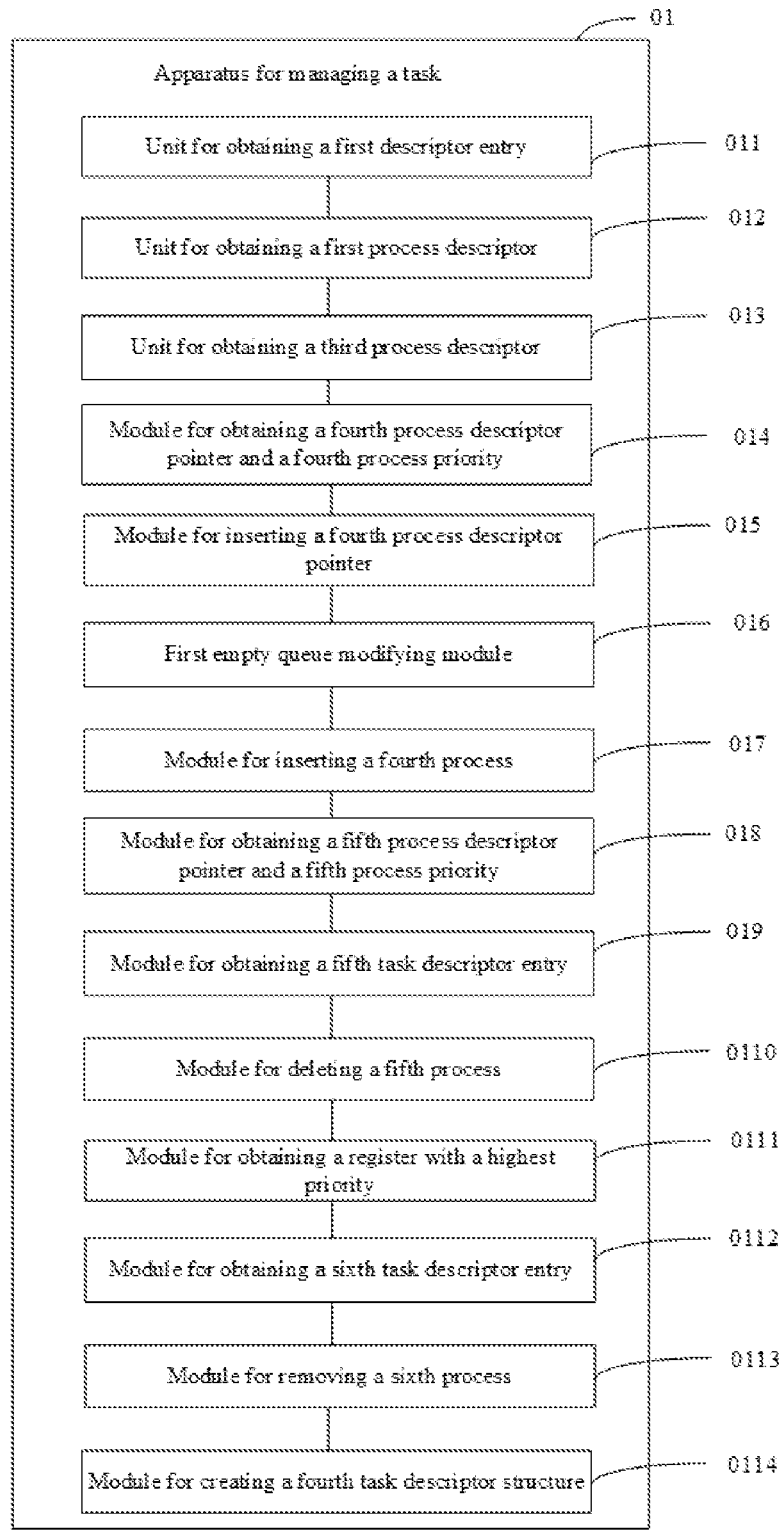
FIG. 24 is a schematic structural diagram 17 of an apparatus for managing a task according to an embodiment of the present disclosure.

Further, as shown in FIG. 24, when the value of the head index in the index register of the empty queue is null, the apparatus 01 further includes a module 0114 for creating a fourth task descriptor structure configured to newly create a fourth task descriptor structure in an external memory; where the module 015 for inserting a fourth process descriptor pointer is configured to modify a value of a process descriptor pointer in the fourth task descriptor structure to the value of the fourth process descriptor pointer; and the module 017 for inserting a fourth process is configured to modify a value of a next task pointer in the fourth task descriptor structure to a value of an external linked list pointer in an index register with the fourth priority; and modify the value of the external linked list pointer in the index register with the fourth priority to an address of the fourth task descriptor structure.

Figure 25:
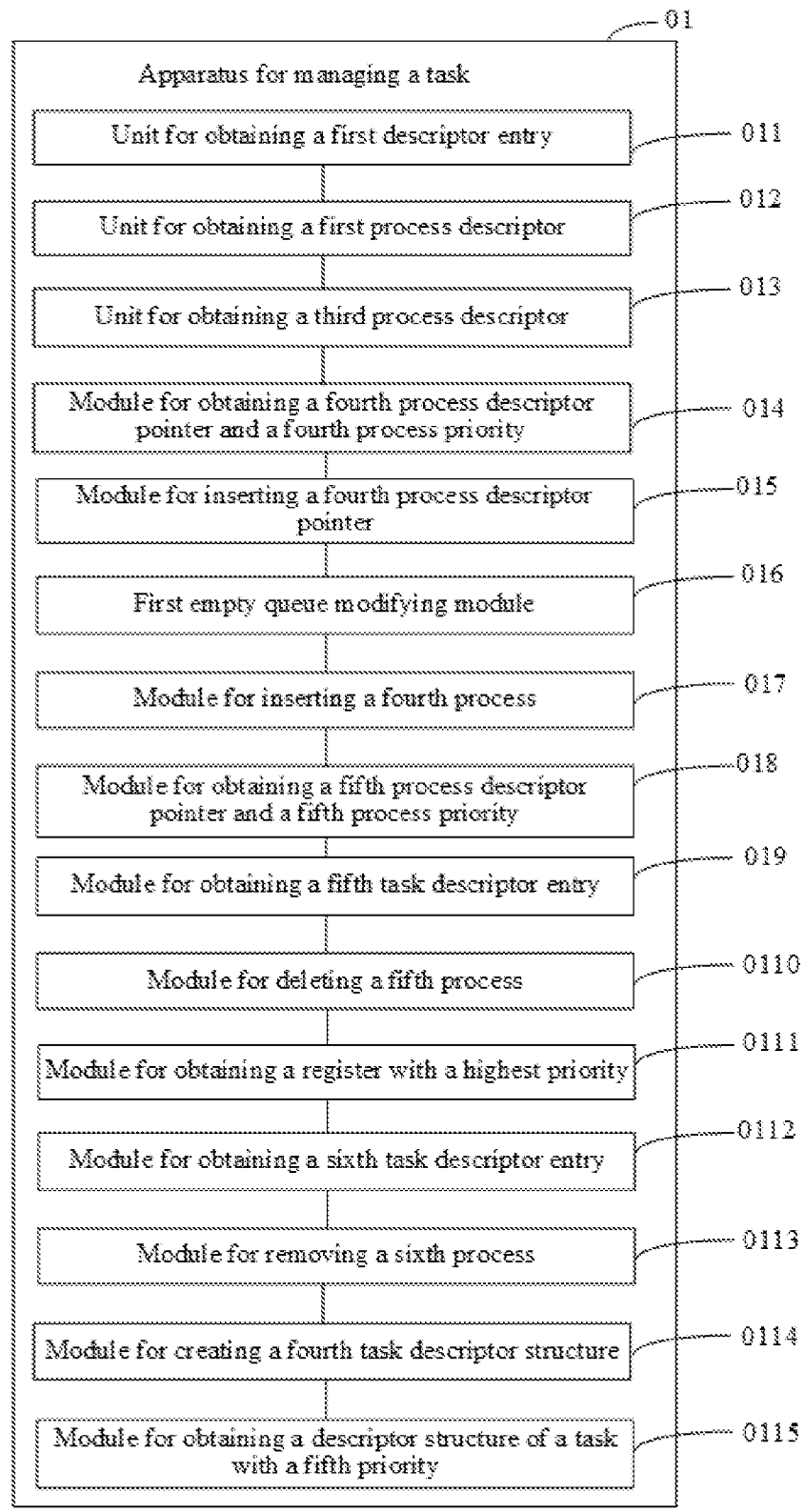
FIG. 25 is a schematic structural diagram 18 of an apparatus for managing a task according to an embodiment of the present disclosure.

Further, as shown in FIG. 25, if the fifth task descriptor entry is not obtained, the apparatus 01 further includes a module 0115 for obtaining a descriptor structure of a task with a fifth priority configured to obtain a linked list of a descriptor structure of a task with the fifth priority according to a value of an external linked list pointer in an index register with the fifth priority, where the linked list of the descriptor structure of the task with the fifth priority is corresponding to the value of the external linked list pointer; and traverse the entire linked list of the descriptor structure of the task of the fifth priority to find a fifth task descriptor structure corresponding to the fifth process; where the module 0110 for deleting a fifth process is configured to remove the fifth process from the linked list of the descriptor structure of the task with the fifth priority.

Figure 26:
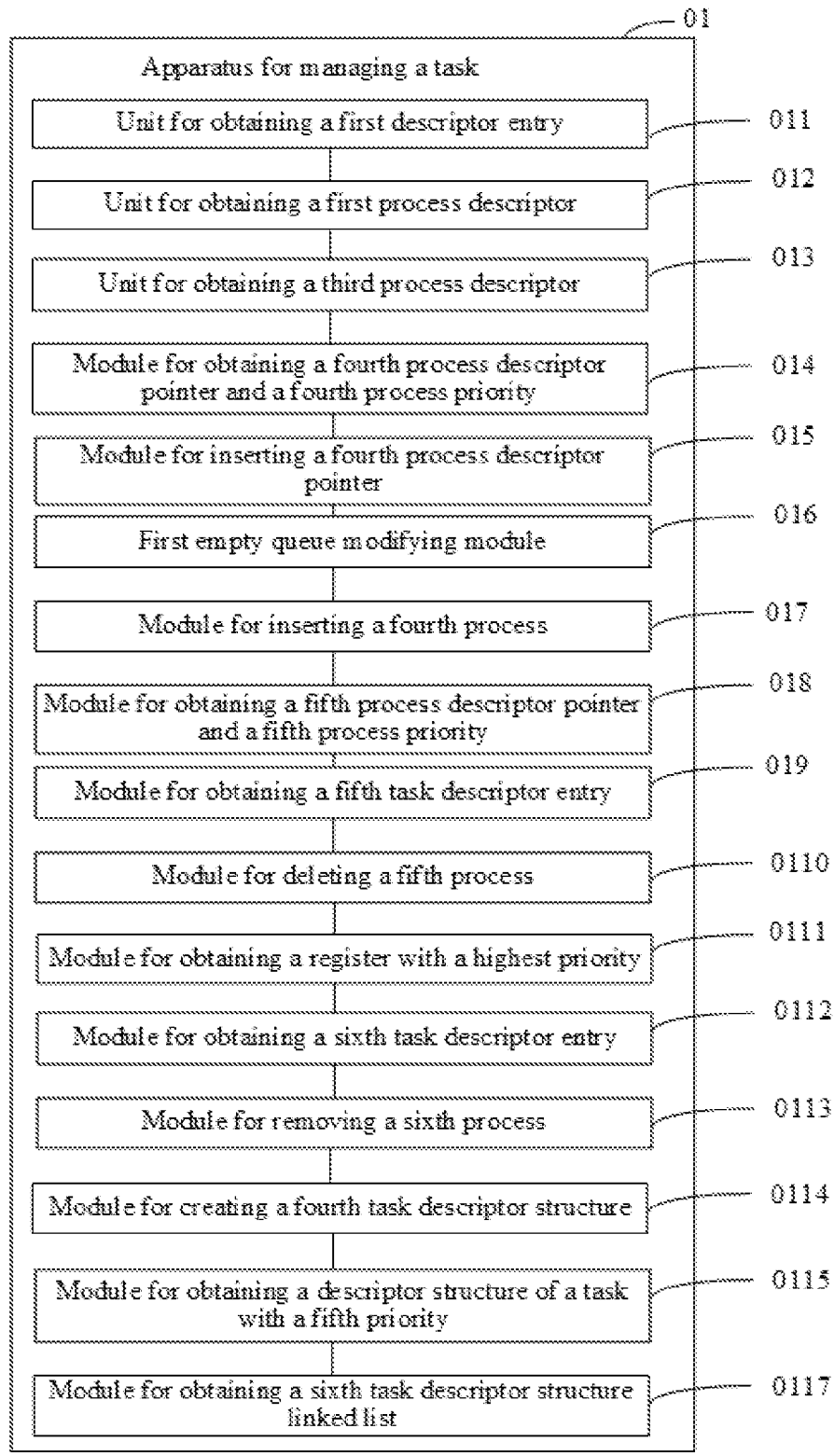
FIG. 26 is a schematic structural diagram 19 of an apparatus for managing a task according to an embodiment of the present disclosure.

Further, as shown in FIG. 26, when the value of the head index in the index register with the sixth priority is null, the apparatus 01 further includes a module 0117 for obtaining a sixth task descriptor structure linked list configured to obtain, according to a value of an external linked list pointer in the index register with the sixth priority, a sixth task descriptor structure linked list corresponding to the value of the external linked list pointer; where the module for removing a sixth process is configured to remove the sixth process from the sixth task descriptor structure linked list.

According to the apparatus for managing a task of a many-core system provided in this embodiment of the present disclosure, in the many-core system, a system task is scheduled and managed by the apparatus for managing a task. When a process needs to be added to a task linked list, a process descriptor pointer of the process is added to a task descriptor entry corresponding to the process, and the task descriptor entry is added to the task linked list; if a process needs to be deleted, a task descriptor entry corresponding to the process is found, and the task descriptor entry is removed from the task linked list; and when a processor core needs to run a new task, an available priority index register with a highest priority is removed from a queue of the priority index register. In the many-core system, the system task can be scheduled and managed by the apparatus for managing a task, which improves process management efficiency in the many-core system.

Figure 27:
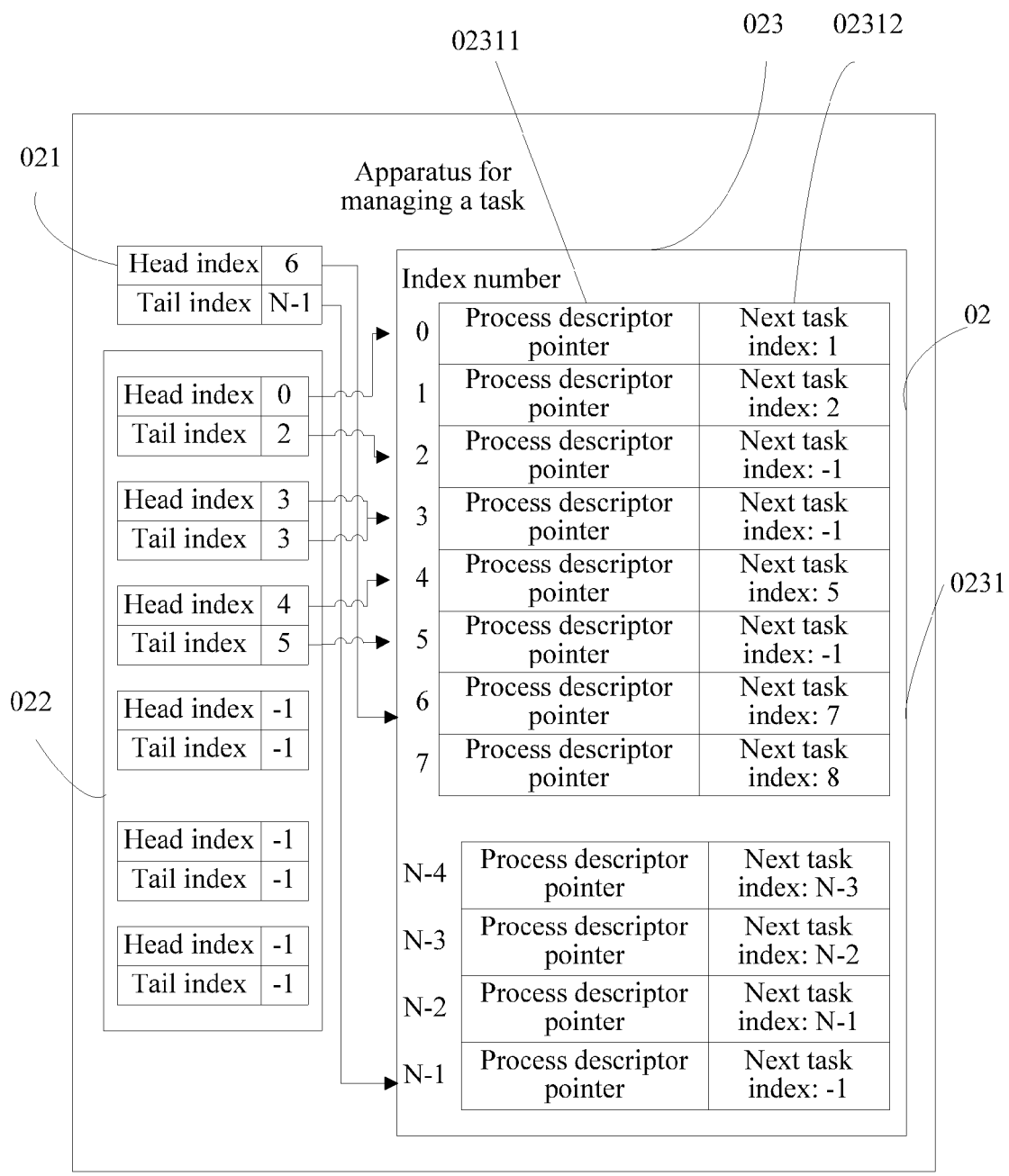
FIG. 27 is a schematic structural diagram 20 of an apparatus for managing a task according to an embodiment of the present disclosure.

An embodiment of the present disclosure provides an apparatus 02 for managing a task, and as shown in FIG. 27, the apparatus 02 for managing a task includes an index register 021 of an empty queue, at least two priority index registers 022, and a task descriptor cache block 023, where the index register 021 of the empty queue and the at least two priority index registers 022 include a head index and a tail index; and the task descriptor cache block 023 includes at least two task descriptor entries 0231, where the task descriptor entry includes a process descriptor pointer 02311 and a next task index 02312.

Figure 28:
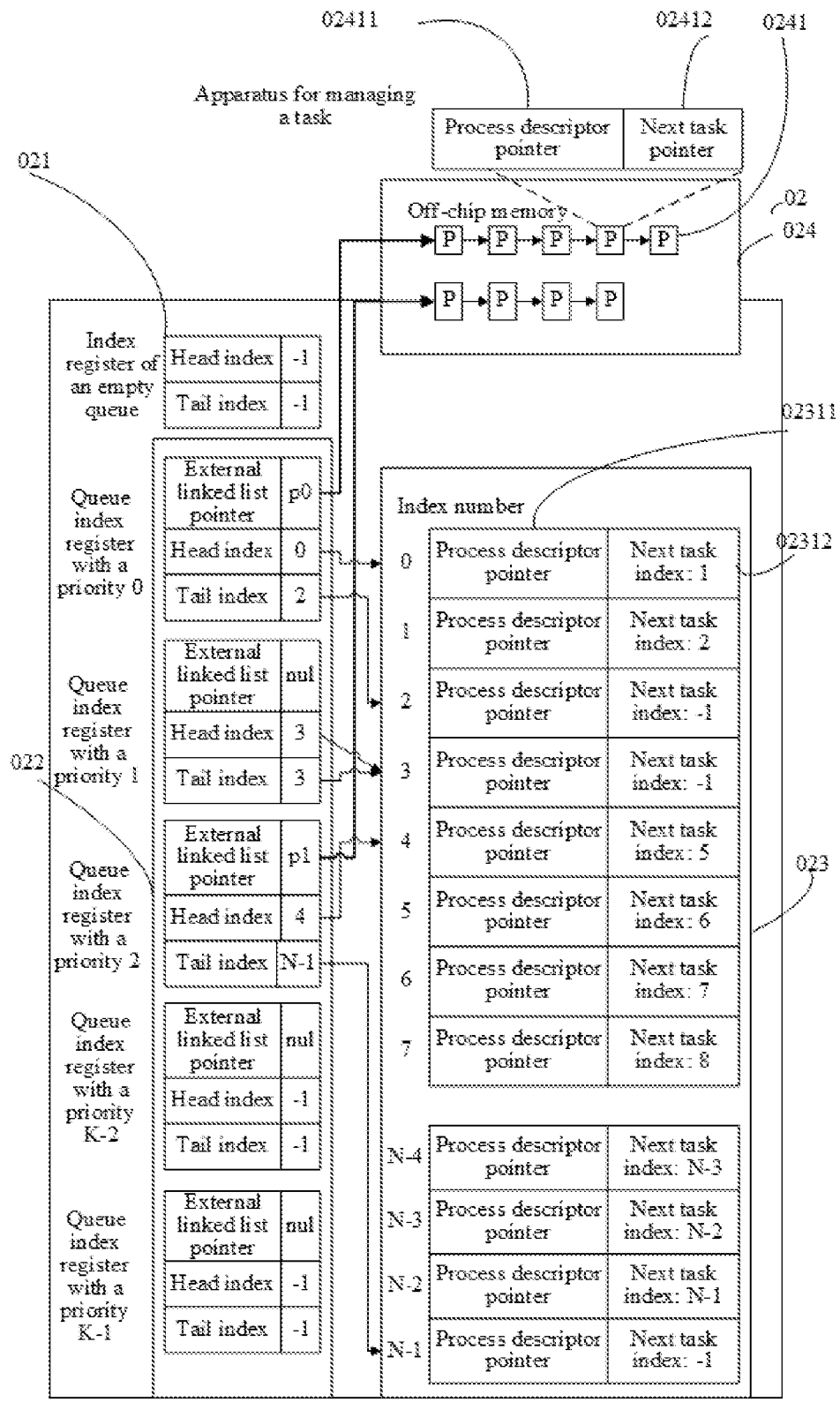
FIG. 28 is a schematic structural diagram 21 of an apparatus for managing a task according to an embodiment of the present disclosure.

Further, as shown in FIG. 28, the apparatus 02 for managing a task further includes an off-chip memory 024, where the off-chip memory 024 includes at least two task descriptor structures 0241, and the task descriptor structure includes a process descriptor pointer 02411 and a next task index 02412.

Further, the off-chip memory 024 is an independent storage device or an independent storage area that is divided from memory of an operating system.

According to the apparatus for managing a task of a many-core system provided in this embodiment of the present disclosure, in the many-core system, a system task is scheduled and managed by the apparatus for managing a task. When a process needs to be added to a task linked list, a process descriptor pointer of the process is added to a task descriptor entry corresponding to the process, and the task descriptor entry is added to the task linked list; if a process needs to be deleted, a task descriptor entry corresponding to the process is found, and the task descriptor entry is removed from the task linked list; and when a processor core needs to run a new task, an available priority index register with a highest priority is removed from a queue of the priority index register. In the many-core system, the system task can be scheduled and managed by the apparatus for managing a task, which improves process management efficiency in the many-core system.

Figure 29:
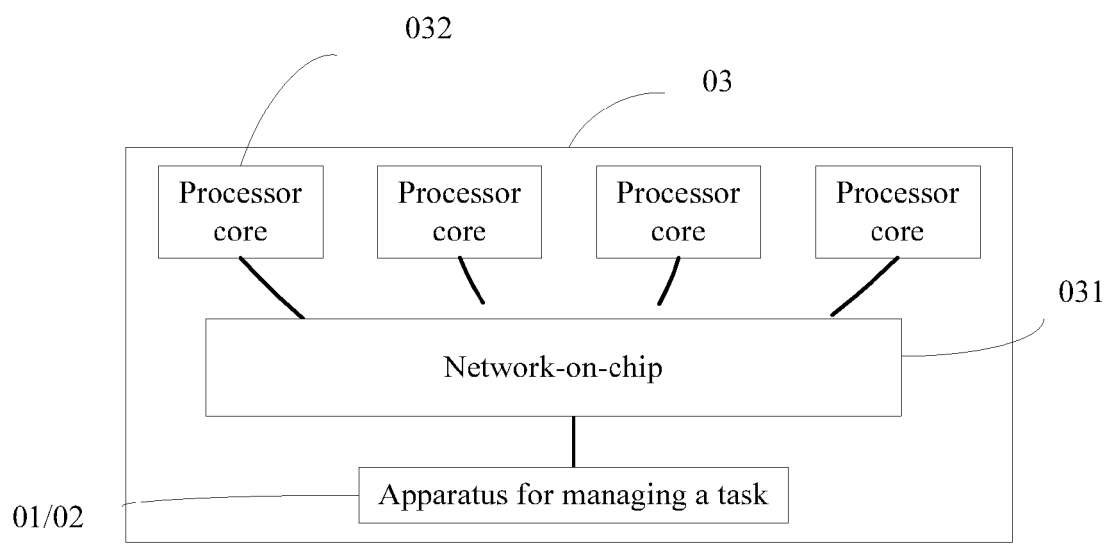
FIG. 29 is a schematic structural diagram of a many-core system according to an embodiment of the present disclosure.

An embodiment of the present disclosure provides a many-core system 03, and as shown in FIG. 29, the many-core system 03 includes the apparatus 01 for managing a task according to the embodiment of the present disclosure or the apparatus 02 for managing a task according to the embodiment of the present disclosure; and a network-on-chip 031, and at least two processor cores 032, where the apparatus 01 or 02 for managing a task is connected to the at least two processor cores 032 using the network-on-chip 031.

According to the many-core system provided in this embodiment of the present disclosure, in the many-core system, a system task is scheduled and managed by an apparatus for managing a task. When a process needs to be added to a task linked list, a process descriptor pointer of the process is added to a task descriptor entry corresponding to the process, and the task descriptor entry is added to the task linked list; if a process needs to be deleted, a task descriptor entry corresponding to the process is found, and the task descriptor entry is removed from the task linked list; and when a processor core needs to run a new task, an available priority index register with a highest priority is removed from a queue of the priority index register. In the many-core system, the system task can be scheduled and managed by the apparatus for managing a task, which improves process management efficiency in the many-core system.

In the several embodiments provided in the present application, it should be understood that the disclosed methods and apparatuses may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for managing a task of a many-core system, the method comprising:
   obtaining a first task descriptor entry for a first process at
      a beginning of a first task queue according to a first head index value of a first head index in a first index register of the first task queue, wherein the first task descriptor entry corresponds to a first index number, wherein the first index number corresponds to the first head index value, wherein the first task descriptor entry comprises a first process descriptor pointer and a first next task index, and wherein the first task descriptor entry is a first entry in an indexed list;

obtaining, according to the first process descriptor pointer, a first process descriptor corresponding to the first process, wherein the first process descriptor pointer points to an address of memory in which the first process descriptor is located;

obtaining a second task descriptor entry according to a first next task index value of the first next task index, wherein the second task descriptor entry comprises a second process descriptor pointer, wherein the second task descriptor entry corresponds to a second index number, and wherein the second index number corresponds to the first next task index, and wherein the second task descriptor entry is a second entry in the indexed list;

obtaining, according to the second process descriptor pointer, a second process descriptor corresponding to a second process associated with the first task queue;

obtaining a last process descriptor corresponding to a tail index value of a tail index in the first index register, wherein the tail index indicates a tail index number corresponding to a last task descriptor entry of a last process at an end of the first task queue, wherein the last process corresponds to a third process, the last process descriptor corresponds to a third process descriptor, and the last task descriptor entry corresponds to a third task descriptor entry; and causing a processor core to run a fourth process by:
obtaining, among index registers with all priorities, a second index register with a first priority that is a highest priority, wherein a second head index value of a second head index in the second index register with the first priority is not null;
obtaining a fourth task descriptor entry corresponding to the second head index value;
modifying the second head index value to a third next task index value of a second next task index in the fourth task descriptor entry;
modifying the third next task index value to a third head index value of a third head index in a third index register of an empty queue;
modifying the third head index value to a third index number corresponding to the fourth task descriptor entry;
determining whether a second tail index value of a second tail index in the third index register of the empty queue is null; and
modifying the second tail index value to the third index number when the second tail index value is null.

2. The method according to claim 1, further comprising:
obtaining a third process descriptor pointer and a first process priority of a fifth process;
obtaining a fifth task descriptor entry according to a fourth head index value of a fourth head index in a fourth index register of a second empty queue, wherein the fifth task descriptor entry corresponds to a fourth index number, and wherein the fifth task descriptor entry comprises a fourth process descriptor pointer and a third next task index;

modifying a first process descriptor pointer value of the fourth process descriptor pointer to a second process descriptor pointer value of the third process descriptor pointer, wherein the fourth index register of the second empty queue is used to record an idle task queue in an idle state;
modifying the fourth head index value to a fourth next task index value of the third next task index;
modifying the fourth next task index value to a fifth head index value of a fifth head index in a fifth index register of a second task queue, wherein the second task queue comprises a second priority corresponding to the first process priority;
modifying the fifth head index value to the fourth index number;
determining that the fourth head index value of the fourth head index in the fourth index register of the second empty queue is null;
creating a task descriptor structure in an external memory;
modifying a third process descriptor pointer value of a fifth process descriptor pointer in the task descriptor structure to the second process descriptor pointer value;
modifying a next task pointer value of a next task pointer in the task descriptor structure to a value of an external linked list pointer in the fifth index register; and
modifying the value of the external linked list pointer in the fifth index register to an address of the task descriptor structure.

3. The method according to claim 1, further comprising deleting a fifth process from a second task queue corresponding to the fifth process by:
obtaining a third process descriptor pointer and a first process priority of the fifth process;
traversing the second task queue to obtain a task descriptor entry that corresponds to a fourth head index value of a fourth head index in a fourth index register of the second task queue, wherein the second task queue comprises a second priority corresponding to the first process priority;
determining whether a fifth task descriptor entry corresponding to the fifth process is obtained from the traversing; and
removing the fifth process from the fourth index register of the second task queue when the fifth task descriptor entry corresponding to the fifth process is obtained from traversing the second task queue.

4. The method according to claim 3, wherein the fifth task descriptor entry comprises a third next task index, wherein the fifth task descriptor entry corresponds to a fourth index number, and wherein removing the fifth process from the fourth index register of the second task queue comprises:
determining whether the fourth head index value or a third tail index value of a third tail index in the fourth index register corresponds to the fourth index number;
modifying the fourth head index value to a fourth next task index value of the third next task index when the fourth head index value corresponds to the fourth index number;
modifying the third tail index value to the fourth next task index value when the third tail index value corresponds to the fourth index number;
modifying the fourth next task index value to a fifth head index value of a fourth head index in a fifth index register of a second empty queue when the fourth head index value does not correspond to the fourth index number;

modifying the fourth next task index value to the fifth head index value when the third tail index value does not correspond to the fourth index number;

modifying the fifth head index value to the fourth index number when the fourth head index value does not correspond to the fourth index number;

modifying the fifth head index value to the fourth index number when the third tail index value does not correspond to the fourth index number;

determining whether a fourth tail index value of a fourth tail index in the fifth index register of the second empty queue is null when the fourth head index value does not correspond to the fourth index number;

determining whether the fourth tail index value is null when the third tail index value does not correspond to the fourth index number; and modifying the fourth tail index value to the fourth, index number when the fourth tail index value is null.

5. The method according to claim 3, further comprising:

obtaining a linked list of a descriptor structure of a task with the second priority according to a value of an external linked list pointer in the third index register when the fifth task descriptor entry corresponding to the fifth process is not obtained, wherein the linked list of the descriptor structure of the task with the second priority corresponds to the value of the external linked list pointer;

traversing the linked list of the descriptor structure of the task with the second priority to find a task descriptor structure that corresponds to the fifth process; and removing the fifth process from the linked list of the descriptor structure of the task with the second priority.

6. The method according to claim 1, further comprising:

determining whether the second head index value of the second head index in the second index register with the first priority is null;

obtaining a linked list of a descriptor structure of a task with the first priority according to a value of an external linked list pointer in the second index register with the first priority when the second head index value is null, wherein the linked list of the descriptor structure of the task with the first priority corresponds to the value of the external linked list pointer; and removing the fourth process from the linked list of the descriptor structure of the task with the first priority.

7. An apparatus for managing a task, the apparatus comprising:

a plurality of index registers of a plurality of task queues including a first task queue, wherein each of the plurality of task queues has a different priority than each other of the plurality of task queues, and wherein the plurality of index registers includes a first index register;

a third index register of an empty queue;

a non-transitory computer-readable storage medium storing programming instructions; and a processor coupled to the non-transitory computer-readable storage medium and configured to execute the programming instructions to:

obtain a first task descriptor entry for a first process at a beginning of the first task queue according to a first head index value of a first head index in the first index register of the first task queue, wherein the first task descriptor entry corresponds to a first index number, wherein the first index number corresponds to the first head index value, wherein the first task descriptor entry comprises a first process descriptor pointer and a first next task index, and wherein the first task descriptor entry is a first entry in an indexed list;

obtain, according to the first process descriptor pointer, a first process descriptor corresponding to the first process, wherein the first process descriptor pointer points to an address of memory in which the first process descriptor is located;

obtain a second task descriptor entry according to a first next task index value of the first next task index, wherein the second task descriptor entry comprises a second process descriptor pointer, wherein the second task descriptor entry corresponds to a second index number, wherein the second index number corresponds to the first next task index, and wherein the second task descriptor entry is a second entry in the indexed list;

obtain, according to the second process descriptor pointer in the second task descriptor entry, a second process descriptor corresponding to a second process associated with the first task queue;

obtain a last process descriptor corresponding to a tail index value of a tail index in the first index register of the first task queue, wherein the tail index indicates a last index number corresponding to a last task descriptor entry of a last process at an end of the first task queue, wherein the last process corresponds to a third process, the last process descriptor corresponds to a third process descriptor, and the last task descriptor entry corresponds to a third task descriptor entry; and cause a processor core to run a fourth process by:

obtaining, among index registers with all priorities, a second index register with a first priority that is a highest priority, wherein a second head index value of a second head index in the second index register with the first priority is not null, and wherein the plurality of index registers includes the second index register;

obtaining a fourth task descriptor entry corresponding to the second head index value;

modifying the second head index value to a third next task index value of a second next task index in the fourth task descriptor entry;

modifying the third next task index value to a third head index value of a third head index in the third index register of the empty queue;

modifying the third head index value to a third index number corresponding to the fourth task descriptor entry;

determining whether a second tail index value of a second tail index in the third index register of the empty queue is null; and modifying the second tail index value to the third index number when the second tail index value is null.

8. The apparatus according to claim 7, wherein the processor is further configured to execute the programming instructions to perform operations comprising:

obtaining a third process descriptor pointer and a first process priority of a fifth process;

obtaining a fifth task descriptor entry according to a fourth head index value of a fourth head index in a fourth index register of a second empty queue, wherein the fifth task descriptor entry corresponds to a fourth index number, and wherein the fifth task descriptor entry comprises a fourth process descriptor pointer and a third next task index;

modifying a first process descriptor pointer value of the fourth process descriptor pointer to a second process descriptor pointer value of the third process descriptor pointer, wherein the fourth index register of the second empty queue is used to record an idle task queue in an idle state;

modifying the fourth head index value to a fourth next task index value of the third next task index;

modifying the fourth next task index value to a fifth head index value of a fifth head index in a fifth index register of a second task queue, wherein the second task queue comprises a second priority corresponding to the first process priority; and modifying the fifth head index value to the fourth index number.

9. The apparatus according to claim 7, wherein the processor is further configured to execute the programming instructions to delete a fifth process from a second task queue by:

obtaining a third process descriptor pointer and a first process priority of the fifth process;

traversing the second task queue to obtain a task descriptor entry that corresponds to a fourth head index value of a fourth head index in a fourth index register of the second task queue, wherein the second task queue comprises a second priority corresponding to the first process priority;

determining whether a fifth task descriptor entry corresponding to the fifth process is obtained from traversing the second task queue; and removing the fifth process from the fourth index register of the second task queue when the fifth task descriptor entry corresponding to the fifth process is obtained from traversing the second task queue.

10. The apparatus according to claim 9, wherein the fifth task descriptor entry comprises a third next task index, wherein the fifth task descriptor entry corresponds to a fourth index number, and wherein the processor is further configured to execute the programming instructions to:

determine whether the fourth head index value corresponds to the fourth index number;

determine whether a third tail index value of a third tail index in the fourth index register corresponds to the fourth index number;

modify the fourth head index value to a fourth next task index value of the third next task index when the fourth head index value corresponds t to the fourth index number;

modify the third tail index value to the fourth next task index value when the third tail index value corresponds to the fourth index number;

modify the fourth next task index value to a fifth head index value of a fourth head index in a fifth index register of an empty queue when the fourth head index value does not correspond to the fourth index number;

modify the fourth next task index value to the fifth head index value when the third tail index value does not correspond to the fourth index number;

modify the fifth head index value to the fourth index number when the fourth head index value does not correspond to the fourth index number;

modify the fifth head index value to the fourth index number when the third tail index value does not correspond to the fourth index number;

determine whether a fourth tail index value of a fourth tail index in the fifth index register of the empty queue is null when the fourth head index value does not correspond to the fourth index number;

determine whether the fourth tail index value is null when the third tail index value does not correspond to the fourth index number; and modify the fourth tail index value to the fourth index number when the fourth tail index value is null.

11. The apparatus according to claim 9, wherein the processor is further configured to execute the programming instructions to:

obtain a linked list of a descriptor structure of a task with the second priority according to a value of an external linked list pointer in the third index register when the fifth task descriptor entry corresponding to the fifth process is not obtained, wherein the linked list of the descriptor structure of the task with the second priority corresponds to the value of the external linked list pointer; and traverse the linked list of the descriptor structure of the task with the second priority to find a task descriptor structure that corresponds to the fifth process; and remove the fifth process from the linked list of the descriptor structure of the task with the second priority.

12. The apparatus according to claim 7, wherein the processor is further configured to execute the programming instructions to:

determine whether the second head index value of the second head index in the second index register with the first priority is null;

obtain, according to a value of an external linked list pointer in the second index register with the first priority when the second head index value is null, a task descriptor structure linked list that corresponds to the value of the external linked list pointer; and remove the fourth process from the task descriptor structure linked list that corresponds to the value of the external linked list pointer.

13. A many-core system, comprising:

a network-on-chip;

at least two processor cores; and an apparatus connected to the at least two processor cores via the network-on-chip, wherein the apparatus comprises:

a plurality of index registers of a plurality of task queues including a first task queue, wherein each of the plurality of task queues has a different priority than each other of the plurality of task queues, and wherein the plurality of index registers includes a first index register;

a second index register of an empty queue;

a non-transitory computer-readable storage medium storing programming instructions; and a processor coupled to the non-transitory computer-readable storage medium and configured to execute the programming instructions to:

obtain a first task descriptor entry for a first process at a beginning of the first task queue according to a first head index value of a first head index in the first index register of the first task queue, wherein the first task descriptor entry corresponds to a first index number, wherein the first index number corresponds to the first head index value, wherein the first task descriptor entry comprises a first process descriptor pointer and a first next task index, and wherein the first task descriptor entry is a first entry in an indexed list;

obtain, according to the first process descriptor pointer, a first process descriptor corresponding to the first process, wherein the first process descriptor pointer points to an address of memory in which the first process descriptor is located;

obtain a second task descriptor entry according to a first next task index value of a first next task index in the first task descriptor entry, wherein the second task descriptor entry comprises a second process descriptor pointer, wherein the second task descriptor entry corresponds to a second index number, wherein the second index number corresponds to the first next task index, and wherein the second task descriptor entry is a second entry in the indexed list;

obtain, according to the second process descriptor pointer in the second task descriptor entry, a second process descriptor corresponding to a second process associated with the first task queue; and obtain a last process descriptor corresponding to a tail index value of a tail index in the first index register of the first task queue, wherein the tail index indicates a last index number corresponding to a last task descriptor entry of a last process at an end of the first task queue, wherein the last process corresponds to a third process, the last process descriptor corresponds to a third process descriptor, and the last task descriptor entry corresponds to a third task descriptor entry; and cause a processor core to insert a fourth process into a second task queue by:

obtaining a third process descriptor pointer and a first process priority of the fourth process;

obtaining a fourth task descriptor entry according to a second head index value of a second head index in a second index register of an empty queue, wherein the fourth task descriptor entry corresponds to a third index number, and wherein the fourth task descriptor entry comprises a fourth process descriptor pointer and a second next task index;

modifying a first process descriptor pointer value of the fourth process descriptor pointer in the fourth task descriptor entry to a second process descriptor value of the third process descriptor pointer, wherein the second index register of the empty queue is used to record an idle task queue in an idle state;

modifying the second head index value to a second next task index value of the second next task index in the fourth task descriptor entry;

modifying the second next task index value to a third head index value of a third head index in a third index register of the second task queue, wherein the second task queue comprises a first priority corresponding to the first process priority; and modifying the third head index value to the third index number.

14. The many-core system according to claim 13, wherein the processor is further configured to execute the programming instructions to delete a fifth process from a third task queue by:

obtaining a fifth process descriptor pointer and a second process priority of the fifth process;

traversing the second task queue to obtain a task descriptor entry that corresponds to a fourth head index value of a fourth head index in a fourth index register of the third task queue, wherein the third task queue comprises a second priority corresponding to the second process priority;

determining whether a fifth task descriptor entry corresponding to the fifth process is obtained from the traversing; and removing the fifth process from the fourth index register of the third task queue when the fifth task descriptor entry corresponding to the fifth process is obtained.

15. The many-core system according to claim 14, wherein the fifth task descriptor entry comprises a third next task index, wherein the fifth task descriptor entry corresponds to a fourth index number, and wherein the processor is further configured to execute the programming instructions to:

determine whether the fourth head index value corresponds to the fourth index number;

determine whether a second tail index value of a second tail index in the fourth index register corresponds to the fourth index number;

modify the fourth head index value to a third next task index value of the third next task index when the fourth head index value corresponds to the fourth index number;

modify the second tail index value to the third next task index value when the second tail index value corresponds to the fourth index number;

modify the third next task index value to a fifth head index value of a fifth head index in a fifth index register of the empty queue when the fourth head index value does not correspond to the fourth index number;

modify the third next task index value to the fifth head index value when the second tail index value does not correspond to the fourth index number;

modify the fifth head index value to the fourth index number when the fourth head index value does not correspond to the fourth index number;

modify the fifth head index value to the fourth index number when the second tail index value does not correspond to the fourth index number;

determine whether a third tail index value of a third tail index in the fifth index register is null when the fourth head index value does not correspond to the fourth index number;

determine whether the third tail index value is null when the second tail index value does not correspond to the fourth index number; and modify the third tail index value to the fourth index number when the third tail index value is null.

* * * * *

UNITED STATES PATENT AND TRADEMARK OFFICE
CERTIFICATE OF CORRECTION

PATENT NO. : 10,002,023 B2
APPLICATION NO. : 14/976029
DATED : June 19, 2018
INVENTOR(S) : Lunkai Zhang et al.

Page 1 of 1

It is certified that error appears in the above-identified patent and that said Letters Patent is hereby corrected as shown below:

On the Title Page

Item (30), Line 1: "201310248251" should be "201310248251.7"

In the Claims

Column 23, Line 47 Claim 10: delete "t" after "corresponds"

Signed and Sealed this
Twenty-eighth Day of August, 2018

Andrei Iancu
*Director of the United States Patent and Trademark Office*